(12) United States Patent
Fischer et al.

(10) Patent No.: US 12,007,217 B2
(45) Date of Patent: Jun. 11, 2024

(54) COMPACT INERTIAL IGNITERS AND IMPULSE SWITCHES WITH ACCIDENTAL ACTIVATION PREVENTION FOR MUNITIONS AND THE LIKE

(71) Applicant: Omnitek Partners LLC, Ronkonkoma, NY (US)

(72) Inventors: Jacques Fischer, Sound Beach, NY (US); Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 17/976,701

(22) Filed: Oct. 28, 2022

(65) Prior Publication Data

US 2023/0140161 A1 May 4, 2023

Related U.S. Application Data

(60) Provisional application No. 63/274,561, filed on Nov. 2, 2021.

(51) Int. Cl.
*F42C 15/24* (2006.01)
*F42C 19/06* (2006.01)

(52) U.S. Cl.
CPC .............. *F42C 15/24* (2013.01); *F42C 19/06* (2013.01)

(58) Field of Classification Search
CPC ........... F42C 15/24; F42C 15/40; F42C 19/06
See application file for complete search history.

(56) References Cited

U.S. PATENT DOCUMENTS

| 3,842,740 A * | 10/1974 | Mirlesse | F42C 14/02 |
| | | | 102/253 |
| 4,006,690 A * | 2/1977 | Stockman | F42C 15/196 |
| | | | 102/236 |
| 2013/0152811 A1* | 6/2013 | Rastegar | F42C 11/008 |
| | | | 102/216 |
| 2021/0278186 A1* | 9/2021 | Rastegar | F42C 15/24 |

* cited by examiner

*Primary Examiner* — J. Woodrow Eldred

(57) ABSTRACT

A device including: a body having one or more walls defining an internal cavity, the wall(s) having one or more grooves extending in a longitudinal direction of the internal cavity and extending at least partially along a periphery of the wall(s); a mass movable in the longitudinal direction within the internal cavity, the mass having one or more holes extending in a direction offset from the longitudinal direction; a ball partially disposed in the groove(s) and partially disposed in each hole(s); and an elastic material for biasing the ball towards the groove(s). The groove(s) having a shape such that the acceleration greater than a predetermined acceleration profile causes the ball to first move opposite to the direction of the acceleration and then bounce to move in the direction of the acceleration until the ball(s) moves into the hole(s) to free the mass to move longitudinally opposite to the acceleration.

19 Claims, 24 Drawing Sheets

COMPACT INERTIAL IGNITERS AND IMPULSE SWITCHES WITH ACCIDENTAL ACTIVATION PREVENTION FOR MUNITIONS AND THE LIKE

CROSS REFERENCE TO RELATED APPLICATION

This application claims the benefit of priority to U.S. Provisional Application No. 63/274,561, filed on Nov. 2, 2021, the entire contents of which is incorporated herein by reference.

GOVERNMENTAL RIGHTS

This invention was made with Government support under Contract No. N68335-19-C-0158, awarded by the U.S. Navy. The Government may have certain rights in this invention.

BACKGROUND

1. Field

The present disclosure relates generally to mechanical inertial igniters and electrical impulse switches, and more particularly to compact, reliable and easy to manufacture mechanical inertial igniters for reserve batteries such as thermal batteries and initiation trains and the like with preset no-fire protection that are activated by shock loadings such as by gun firing setback acceleration with a prescribed level and duration or the like.

2. Prior Art

Reserve batteries of the electrochemical type are well known in the art for a variety of uses where storage time before use is extremely long. Reserve batteries are in use in applications such as batteries for gun-fired munitions including guided and smart, mortars, fusing mines, missiles, and many other military and commercial applications. The electrochemical reserve-type batteries can in general be divided into two different basic types.

The first type includes the so-called thermal batteries, which operate at high temperatures. Unlike liquid reserve batteries, in thermal batteries the electrolyte is already in the cells and therefore does not require a release and distribution mechanism such as spinning. The electrolyte is dry, solid and non-conductive, thereby leaving the battery in a non-operational and inert condition. These batteries incorporate pyrotechnic heat sources to melt the electrolyte just prior to use in order to make them electrically conductive and thereby making the battery active. The most common internal pyrotechnic is a blend of Fe and $KClO_4$. Thermal batteries utilize a molten salt to serve as the electrolyte upon activation. The electrolytes are usually mixtures of alkali-halide salts and are used with the $Li(Si)/FeS_2$ or $Li(Si)/CoS_2$ couples. Some batteries also employ anodes of Li(Al) in place of the Li(Si) anodes. Insulation and internal heat sinks are used to maintain the electrolyte in its molten and conductive condition during the time of use.

Thermal batteries have long been used in munitions and other similar applications to provide a relatively large amount of power during a relatively short period of time, mainly during the munitions flight. Thermal batteries have high power density and can provide a large amount of power as long as the electrolyte of the thermal battery stays liquid, thereby conductive. The process of manufacturing thermal batteries is highly labor intensive and requires relatively expensive facilities. Fabrication usually involves costly batch processes, including pressing electrodes and electrolytes into rigid wafers, and assembling batteries by hand. The batteries are encased in a hermetically sealed metal container that is usually cylindrical in shape.

The second type includes the so-called liquid reserve batteries in which the electrodes are fully assembled for cooperation, but the liquid electrolyte is held in reserve in a separate container until the batteries are desired to be activated. In these types of batteries, by keeping the electrolyte separated from the battery cell, the shelf life of the batteries is essentially unlimited. The battery is activated by transferring the electrolyte from its container to the battery electrode compartment (hereinafter referred to as the "battery cell").

A typical liquid reserve battery is kept inert during storage by keeping the aqueous electrolyte separate in a glass or metal ampoule or in a separate compartment inside the battery case. The electrolyte compartment may also be separated from the electrode compartment by a membrane or the like. Prior to use, the battery is activated by breaking the ampoule or puncturing the membrane allowing the electrolyte to flood the electrodes. The breaking of the ampoule or the puncturing of the membrane is achieved either mechanically using certain mechanisms usually activated by the firing setback acceleration or by the initiation of certain pyrotechnic material. In these batteries, the projectile spin or a wicking action is generally used to transport the electrolyte into the battery cells.

Reserve batteries are inactive and inert when manufactured and become active and begin to produce power only when they are activated. Reserve batteries have the advantage of very long shelf life of up to 20 years that is required for munitions applications.

Thermal batteries generally use some type of initiation device (igniter) to provide a controlled pyrotechnic reaction to produce output gas, flame, or hot particles to ignite the heating elements of the thermal battery. There are currently two distinct classes of igniters that are available for use in thermal batteries. The first class of igniter operates based on electrical energy. Such electrical igniters, however, require electrical energy, thereby requiring an onboard battery or other power sources with related shelf life and/or complexity and volume requirements to operate and initiate the thermal battery. The second class of igniters, commonly called "inertial igniters," operate based on the firing acceleration. The inertial igniters do not require onboard batteries for their operation and are thereby often used in munitions applications such as in gun-fired munitions and mortars.

Inertial igniters are also used to activate liquid reserve batteries through the rupture of the electrolyte storage container or membrane separating it from the battery core. The inertial igniter mechanisms may also be used to directly rupture the electrolyte storage container or membrane.

Inertial igniters used in munitions must be capable of activating only when subjected to the prescribed setback acceleration levels and durations and not when subjected to any of the so-called no-fire conditions such as accidental drops or transportation vibration or the like. This means that safety in terms of prevention of accidental ignition is one of the main concerns in inertial igniters.

In recent years, new improved chemistries and manufacturing processes have been developed that promise the development of lower cost and higher performance thermal and liquid reserve batteries that could be produced in various shapes and sizes, including their small and miniaturized versions.

Mechanical inertial igniters have been developed for many munitions applications in which the munitions are subjected to relatively high firing setback accelerations of generally over 1,000 Gs with long enough duration that provides enough time for the inertial igniter to activate the igniter pyrotechnic material, which may consist of a primer or an appropriate pyrotechnic material that is directly applied to the inertial igniter as described in previous art (for example, U.S. Pat. Nos. 9,160,009, 8,550,001, 8,931,413, 7,832,335 and 7,437,995, the contents of which are hereby considered included by reference).

Inertia-based igniters must provide two basic functions. The first function is to provide the capability to differentiate the aforementioned accidental events such as drops over hard surfaces or transportation vibration or the like, i.e., all no-fire events, from the prescribed firing setback acceleration (all-fire) event. In inertial igniters, this function is usually performed by either keeping the device striker fixed to the device structure during all aforementioned no-fire events until the prescribed firing setback acceleration event is detected or allowing for a limited motion of the device striker, within which it does not strike the igniter percussion primer of other provided pyrotechnic material. The second function of an inertia-based igniter is to provide the means of accelerating the device striker to the kinetic energy level that is needed to initiate the device percussion primer or other pyrotechnic material as it (hammer element) strikes an "anvil" over which the pyrotechnic material is provided. In general, the striker is provided with a relatively sharp point which strikes the percussion primer or pyrotechnic material covering a raised surface over the anvil, thereby allowing a relatively thin pyrotechnic layer to be pinched to achieve a reliable ignition mechanism. In many applications, percussion primers can be used due to the cost considerations. In all such inertial igniters, exit holes are provided on the inertial igniter to allow the reserve battery activating flames and sparks to exit.

Two basic methods are currently available for accelerating the device striker to the needed velocity (kinetic energy) level for percussion primer or provided pyrotechnic material described above. The first method is based on allowing the setback acceleration to accelerate the striker mass following its release. This method requires the setback acceleration to have long enough duration to allow for the time that it takes for the striker mass to be released and for the striker mass to be accelerated to the required velocity before pyrotechnic impact. As a result, this method is applicable to larger caliber and mortar munitions in which the setback acceleration duration is relatively long and in the order of several milliseconds, sometimes even longer than 10-15 milliseconds. This method is also suitable for impact induced initiations in which the impact induced decelerations have relatively long duration.

The second method relies on potential energy stored in a spring (elastic) element, which is then released upon the detection of the prescribed all-fire conditions. This method is suitable for use in munitions that are subjected to very short setback accelerations, such as those of the order of 1-2 milliseconds or when the setback acceleration level is low and space constraints does now allow the use of relatively large striker mass or where the height limitations of the available space for the inertial igniter does not provide enough travel distance for the inertial igniter striker to gain the required velocity and thereby kinetic energy to initiate the pyrotechnic material.

Inertia-based igniters must therefore comprise two components so that together they provide the described mechanical safety, the capability to differentiate the prescribed all-fire condition from all no-fire conditions, and to provide the required striking action to achieve ignition of the percussion primer or other provided pyrotechnic material. The function of the safety system is to keep the striker element in a relatively fixed position until the prescribed all-fire condition (or the prescribed impact induced deceleration event) is detected, at which time the striker element is to be released, allowing it to accelerate toward its target under the influence of the remaining portion of the setback acceleration or the potential energy stored in its spring (elastic) element of the device.

The ignition itself may also be configured with ignition material that provide ignition by contact or proximity. For example, the striker-target pair may bring together one or more chemical compounds whose combination with or without impact will set off a reaction resulting in the desired ignition.

A schematic of a cross-section of a conventional thermal battery and inertial igniter assembly is shown in FIG. 1. In thermal battery applications, the inertial igniter 10 (as assembled in a housing) is generally positioned above (in the direction of the acceleration) the thermal battery housing 11 as shown in FIG. 1. Upon ignition, the igniter initiates the thermal battery pyrotechnics positioned inside the thermal battery through a provided access 12. The total volume that the thermal battery assembly 16 occupies within munitions is determined by the diameter 17 of the thermal battery housing 11 (assuming it is cylindrical) and the total height 15 of the thermal battery assembly 16. The height 14 of the thermal battery for a given battery diameter 17 is generally determined by the amount of energy that it must produce over the required period of time. For a given thermal battery height 14, the height 13 of the inertial igniter 10 would therefore determine the total height 15 of the thermal battery assembly 16. To reduce the total space that the thermal battery assembly 16 occupies within a munitions housing (usually determined by the total height 15 of the thermal battery), it is therefore important to reduce the height of the inertial igniter 10. This can be important for small thermal batteries since in such cases and with currently available inertial igniter, the height of the inertial igniter portion 13 is a significant portion of the thermal battery height 15.

A configuration of an inertial igniter for satisfying the safety (no initiation) requirement when dropped from heights of up to 7 feet (up to 2,000 G impact deceleration with a duration of up to 0.5 msec) is described below using one such embodiment disclosed in the aforementioned patents. An isometric cross-sectional view of this embodiment 200 of the inertia igniter is shown in FIG. 2. The full isometric view of the inertial igniter 200 is shown in FIG. 3. The inertial igniter 200 is constructed with igniter body 201, consisting of a base 202 and at least three posts 203. The base 202 and the at least three posts 203, can be integral but may be constructed as separate pieces and joined together, for example by welding or press fitting or other methods commonly used in the art. The base of the housing 202 is also provided with at least one opening 204 (with a corresponding opening in the thermal battery 12 in FIG. 1) to allow the ignited sparks and fire to exit the inertial igniter into the thermal battery core under the inertial igniter 200 upon initiation of the inertial igniter pyrotechnics 215, FIG.

2, or percussion cap primer when used in place of the pyrotechnics 215 as disclosed therein.

In addition, in certain applications, while the firing setback acceleration levels are relatively very low, sometimes in the order of several hundred or even lower Gs, the inertial igniter is required to provide protection against initiation when dropped from 5-7 feet or higher on hard surfaces, usually acceleration shocks with peaks that may reach well over 2,000 Gs, sometimes up to 10,000-18,000 G with 0.5 msec or longer durations. In addition, the inertial igniters are routinely required to be small and occupy as little volume as possible.

A striker mass 205 is shown in its locked position in FIG. 2. The striker mass 205 is provided with vertical surfaces 206 that are used to engage the corresponding (inner) surfaces of the posts 203 and serve as guides to allow the striker mass 205 to ride down along the length of the posts 203 without rotation with an essentially pure up and down translational motion. The vertical surfaces 206 may be recessed to engage the inner three surfaces of the properly shaped posts 203.

In its illustrated position in FIGS. 2 and 3, the striker mass 205 is locked in its axial position to the posts 203 by at least one setback locking ball 207. The setback locking ball 207 locks the striker mass 205 to the posts 203 of the inertial igniter body 201 through the holes 208 provided in the posts 203 and a concave portion such as a dimple (or groove) 209 on the striker mass 205 as shown in FIG. 2. A setback spring 210, which can be in compression, is also provided around but close to the posts 203 as shown in FIGS. 2 and 3. In the configuration shown in FIG. 2, the locking balls 207 are prevented from moving away from their aforementioned locking position by the collar 211. The collar 211 can be provided with partial guide 212 ("pocket"), which are open on the top as indicated by numeral 213. The guides 213 may be provided only at the locations of the locking balls 207 as shown in FIGS. 2 and 3 or may be provided as an internal surface over the entire inner surface of the collar 211 (not shown). The advantage of providing local guides 212 is that it would result in a significantly larger surface contact between the collar 211 and the outer surfaces of the posts 203, thereby allowing for smoother movement of the collar 211 up and down along the length of the posts 203. In addition, they would prevent the collar 211 from rotating relative to the inertial igniter body 201 and makes the collar stronger and more massive. The advantage of providing a continuous inner recess guiding surface for the locking balls 207 is that it would require fewer machining processes during the collar manufacture.

The collar 211 can ride up and down the posts 203 as can be seen in FIGS. 2 and 3 but is biased to stay in its upper most position as shown in FIGS. 2 and 3 by the setback spring 210. The guides 212 are provided with bottom ends 214, so that when the inertial igniter is assembled as shown in FIGS. 2 and 3, the setback spring 210 which is biased (preloaded) to push the collar 211 upward away from the igniter base 201, would hold the collar 211 in its uppermost position against the locking balls 207. As a result, the assembled inertial igniter 200 stays in its assembled state and would not require a top cap to prevent the collar 211 from being pushed up and allowing the locking balls 207 from moving out and releasing the striker mass 205.

In this embodiment, a one-part pyrotechnics compound 215 (such as lead styphnate or some other similar compounds) is used as shown in FIG. 2. The surfaces to which the pyrotechnic compound 215 is attached can be roughened and/or provided with surface cuts, recesses, or the like and/or treated chemically as commonly done in the art (not shown) to ensure secure attachment of the pyrotechnics material to the applied surfaces. The use of one-part pyrotechnics compound makes the manufacturing and assembly process much simpler and thereby leads to lower inertial igniter cost. The striker mass can be provided with a relatively sharp tip 216 and the igniter base surface 202 is provided with a protruding tip 217 which is covered with the pyrotechnics compound 215, such that as the striker mass is released during an all-fire event and is accelerated down, impact occurs mostly between the surfaces of the tips 216 and 217, thereby pinching the pyrotechnics compound 215, thereby providing the means to obtain a reliable initiation of the pyrotechnics compound 215.

Alternatively, instead of using the pyrotechnics compound 215, FIG. 2, a percussion cap primer can be used. An appropriately shaped striker tip can be provided at the tip 216 of the striker mass 205 (not shown) to facilitate initiation upon impact.

The basic operation of the embodiment 200 of the inertial igniter of FIGS. 2 and 3 is now described. In case of any non-trivial acceleration in the axial direction 218 which can cause the collar 211 to overcome the resisting force of the setback spring 210 will initiate and sustain some downward motion of the collar 211. The force due to the acceleration on the striker mass 205 is supported at the dimples 209 by the locking balls 207 which are constrained inside the holes 208 in the posts 203. If the acceleration is applied over long enough time in the axial direction 218, the collar 211 will translate down along the axis of the assembly until the setback locking balls 205 are no longer constrained to engage the striker mass 205 to the posts 203. If the event acceleration and its time duration is not sufficient to provide this motion (i.e., if the acceleration level and its duration are less than the predetermined threshold), the collar 211 will return to its start (top) position under the force of the setback spring 210 once the event has ceased.

Assuming that the acceleration time profile was at or above the specified "all-fire" profile, the collar 211 will have translated down past the locking balls 207, allowing the striker mass 205 to accelerate down towards the base 202. In such a situation, since the locking balls 207 are no longer constrained by the collar 211, the downward force that the striker mass 205 has been exerting on the locking balls 207 will force the locking balls 207 to move outward in the radial direction. Once the locking balls 207 are out of the way of the dimples 209, the downward motion of the striker mass 205 is no longer impeded. As a result, the striker mass 205 accelerates downward, causing the tip 216 of the striker mass 205 to strike the pyrotechnic compound 215 on the surface of the protrusion 217 with the requisite energy to initiate ignition.

In the embodiment 200 of the inertial igniter shown in FIGS. 2 and 3, the setback spring 210 is of a helical wave spring type fabricated with rectangular cross-sectional wires (such as the ones manufactured by Smalley Steel Ring Company of Lake Zurich, Illinois). This is in contrast with the helical springs with circular wire cross-sections used in other available inertial igniters. The use of the rectangular cross-section wave springs or the like has the following significant advantages over helical springs that are constructed with wires with circular cross-sections. Firstly, and most importantly, as the spring is compressed and nears its "solid" length, the flat surfaces of the rectangular cross-section wires come in contact, thereby generating minimal lateral forces that would otherwise tend to force one coil to move laterally relative to the other coils as is usually the case when the wires are circular in cross-section. Lateral movement of the coils can, in general, interfere with the proper operation of the inertial igniter since it could, for example, jam a coil to the outer housing of the inertial igniter (not shown in FIGS. 2 and 3), which is usually desired to house the igniter 200 or the like with minimal clearance to minimize the total volume of the inertial igniter. In addition, the laterally moving coils could also jam against the posts 203 thereby further interfering with the proper operation of the inertial igniter. The use of the wave springs with rectangular cross-section would therefore significantly increase the reliability of the inertial igniter and significantly increase the repeatability of the initiation for a specified all-fire condition.

In the embodiment 200 of FIGS. 2 and 3, following ignition of the pyrotechnics compound 215, the generated flames and sparks are configured to exit downward through the opening 204 to initiate the thermal battery below. Alternatively, if the thermal battery is positioned above the inertial igniter 200, the opening 204 can be eliminated and the striker mass could be provided with at least one opening (not shown) to guide the ignition flame and sparks up through the striker mass 205 to allow the pyrotechnic materials (or the like) of a thermal battery (or the like) positioned above the inertial igniter 200 (not shown) to be initiated.

Alternatively, side ports may be provided to allow the flame to exit from the side of the igniter to initiate the pyrotechnic materials (or the like) of a thermal battery or the like that is positioned around the body of the inertial igniter. Other alternatives known in the art may also be used.

In FIGS. 2 and 3, the inertial igniter embodiment 200 is shown without any outside housing. In many applications, as shown in the schematics of FIG. 4a (4b), the inertial igniter 240 (250) is placed securely inside the thermal battery 241 (251), either on the top (FIG. 4a) or bottom (FIG. 4b) of the thermal battery housing 242 (252). This can be the case for relatively small thermal batteries. In such thermal battery configurations, since the inertial igniter 240 (250) is inside the hermetically sealed thermal battery 241 (251), there is no need for a separate housing to be provided for the inertial igniter itself. In this assembly configuration, the thermal battery housing 242 (252) is provided with a separate compartment 243 (253) for the inertial igniter. The inertial igniter compartment 243 (253) can be formed by a member 244 (254) which is fixed to the inner surface of the thermal battery housing 242 (253), for example, by welding, brazing or very strong adhesives or the like. The separating member 244 (254) is provided with an opening 245 (255) to allow the generated flame and sparks following the initiation of the inertial igniter 240 (250) to enter the thermal battery compartment 246 (256) to activate the thermal battery 241 (251). The separating member 244 (254) and its attachment to the internal surface of the thermal battery housing 242 (252) must be strong enough to withstand the forces generated by the firing acceleration.

For larger thermal batteries, a separate compartment (similar to the compartment 10 over or possibly under the thermal battery hosing 11 as shown in FIG. 1) can be provided above, inside or under the thermal battery housing for the inertial igniter. An appropriate opening (similar to the opening 12 in FIG. 1) can also be provided to allow the flame and sparks generated as a result of inertial igniter initiation to enter the thermal battery compartment (similar to the compartment 14 in FIG. 1) and activate the thermal battery.

The inertial igniter 200, FIGS. 2 and 3, may also be provided with a housing 260 as shown in FIG. 5. The housing 260 can be one piece and fixed to the base 202 of the inertial igniter structure 201, such as by soldering, laser welding or appropriate epoxy adhesive or any other of the commonly used techniques to achieve a sealed compartment. The housing 260 may also be crimped to the base 202 at its open end 261, in which case the base 202 can be provided with an appropriate recess 262 to receive the crimped portion 261 of the housing 260. The housing can be sealed at or near the crimped region via one of the commonly used techniques such as those described above.

It is appreciated by those skilled in the art that by varying the mass of the striker 205, the mass of the collar 211, the spring rate of the setback spring 210, the distance that the collar 211 has to travel downward to release the locking balls 207 and thereby release the striker mass 205, and the distance between the tip 216 of the striker mass 205 and the pyrotechnic compound 215 (and the tip of the protrusion 217), the disclosed inertial igniter 200 can be configured to match the all-fire and no-fire impulse level requirements for various applications as well as the safety (delay or dwell action) protection against accidental dropping of the inertial igniter and/or the munitions or the like within which it is assembled.

Briefly, the safety system parameters, i.e., the mass of the collar 211, the spring rate of the setback spring 210 and the dwell stroke (the distance that the collar 211 must travel downward to release the locking balls 207 and thereby release the striker mass 205) must be tuned to provide the required actuation performance characteristics. Similarly, to provide the requisite impact energy, the mass of the striker 205 and the aforementioned separation distance between the tip 216 of the striker mass and the pyrotechnic compound 215 (and the tip of the protrusion 217) must work together to provide the specified impact energy to initiate the pyrotechnic compound when subjected to the remaining portion of the prescribed initiation acceleration profile after the safety system has been actuated.

The significant shortcomings of the prior art inertial igniters are related firstly to the need to be significantly redesigned and make major changes in the inertial igniter geometry and its components to satisfy a new set of (all-fire and no-fire) requirements for each new application. This means that a major engineering effort is generally needed for each new application, which would also require new sets of performance and reliability testing, which together translates to a significant cost. Secondly, the basic design of the prior art inertial igniters shown in FIGS. 1-4, such as the geometry of the base 202 and its posts 203, the presence of the collar 211 and its specialized setback spring 210, make the design and its manufacture relatively complex and thereby costly. Thirdly, the basic design of the prior art inertial igniters shown in FIGS. 1-4, such as due to the presence of the setback spring 210 and the collar 211 and the need for its free movement outside the posts 203 demand a certain amount of open space around the inertial igniter as it is assembled inside a battery housing. As a result, the actual volume occupied by the inertial igniter becomes larger than the inertial igniter itself and the battery manufacturer must make sure that the volume around the inertial igniter stays clear, which usually means that the inertial igniter has to be either assembled in a separate compartment as shown in FIGS. 1 and 4 or be provided with its own housing as shown in FIG. 5. Fourthly, due to the above reasons, the prior art inertial igniters shown in FIGS. 1-4 cannot be designed in very compact form with no additional volume and/or compartment or housing requirement for their assembly inside batteries.

It is also appreciated by those skilled in the art that currently available G-switches of different type that are used for opening or closing an electrical circuit are designed to perform this function when they are subjected to a prescribed acceleration level without accounting for the duration of the acceleration level. As such, they suffer from the shortcoming of being activated accidentally, e.g., when the object in which they are used is subjected to short duration shock loading such as could be experienced when dropped on a hard surface as was previously described for the case of inertial igniter used in munitions.

When used in applications such as in munitions, it is highly desirable for G-switches to be capable to differentiate the previously indicated accidental and short duration shock (acceleration) events such as those experienced by dropping on hard surfaces, i.e., all no-fire conditions, from relatively longer duration firing setback (shock) accelerations, i.e., all-fire condition. Such G-switches should activate when firing setback (all-fire) acceleration and its duration results in an impulse level threshold corresponding to the all-fire event has been reached, i.e., they must operate as an "impulse switch". This requirement necessitates the employment of safety mechanisms like those used in the inertial igniter embodiments, which can allow the switch activation only when the firing setback acceleration level and duration thresholds have been reached. The safety mechanism can be thought of as a mechanical delay mechanism, after which a separate electrical switch mechanism is actuated or released to provide the means of opening or closing at least one electrical circuit.

Such impulse switches with the aforementioned integrated safety mechanisms are highly desirable to be very small in size so that they could be readily used on electronic circuit boards of different products such as munitions or the like.

SUMMARY

A need therefore exists for compact mechanical inertial igniters that occupy minimal volume when integrated into thermal reserve or other reserve batteries and the like for initiation when subjected to a prescribed minimum acceleration for a minimum of duration, and that the inertial igniter is highly reliable, for example, have better than 99.9 percent reliability with 95 percent confidence level.

A need also exists for mechanical inertial igniters that can satisfy the safety requirement of munitions, i.e., the no-fire conditions, such as accidental drops and transportation vibration and other similar events.

A need also exists for compact mechanical inertial igniters that can be readily modified to satisfy other all-fire and no-fire requirements without requiring significant overall and component modifications.

A need therefore exists for miniature mechanical inertial igniters for thermal reserve and other reserve batteries in gun-fired munitions, mortars, rockets, and the like, such as for small thermal batteries that could be used in fuzing and other similar applications, that are safe (i.e., satisfy the munitions no-fire conditions), are compact and occupy minimal volume inside the thermal battery.

Such innovative inertial igniters are can be scalable to thermal reserve and other reserve batteries of various sizes, such as to miniaturized inertial igniters for small size thermal batteries. Such inertial igniters are generally also required not to initiate if dropped from heights of up to 5-7 feet onto a concrete floor, which can result in impact induced inertial igniter accelerations of up to 2000 G magnitude that may last up to 0.5 msec. In certain applications, the inertial igniter may be subjected to significantly higher accidental (no-fire) accelerations of 10,000-18,000 G magnitude that may last up to 1 msec. The inertial igniters are also generally required to withstand high firing accelerations, for example up to 20-50,000 Gs (i.e., not to damage the thermal battery); and configured to ignite at prescribed minimum acceleration threshold when subjected to such accelerations for a prescribed amount of time, determined from the munition firing acceleration profile.

To ensure safety and reliability, inertial igniters should not initiate during acceleration events which may occur during manufacture, assembly, handling, transport, accidental drops, etc. Additionally, once under the influence of an acceleration profile particular to the intended firing of ordinance from a gun, the device should initiate with high reliability. It is also conceivable that the igniter will experience incidental low but long-duration accelerations, whether accidental or as part of normal handling, such as during transportation, which must be guarded against initiation. Again, the impulse given to the inertial igniter will have a great disparity with that given by the prescribed munition initiation acceleration profile because the magnitude of the incidental long-duration acceleration will be quite low.

In addition, the inertial igniters used in munitions are generally required to have a shelf life of better than 20 years and could generally be stored at temperatures of sometimes in the range of −65 to 165 degrees F. The inertial igniter configuration must also consider the manufacturing costs and simplicity in the configurations to make them cost effective for munitions applications.

Accordingly, fully mechanical compact inertial igniters are provided that can satisfy a wide range of munition prescribed all-fire and no-fire requirements. Such inertial igniter do not rely on stored potential energy. Such inertial igniters can be suitable for use in a wide range of gun-fired munitions, mortars and rockets and the like.

The mechanical compact inertial igniters for initiation of thermal or other reserve batteries can be activated upon target impact.

The mechanical compact inertial igniters can be activated by certain linear or rotary actuation device upon firing, or after a prescribed delay following firing, or upon target impact.

Also provided are fully mechanical compact igniters that can satisfy a wide range of munition prescribed all-fire and no-fire requirements. Such inertial igniters can be suitable for relatively small reserve batteries used in munitions.

Also provided are fully mechanical compact igniters that can be initiated upon target impact.

Also provided are fully mechanical compact inertial igniters for activating certain linear or rotary actuation devices upon firing, or after a prescribed delay following firing, or upon target impact.

Those skilled in the art will appreciate that the inertial igniters disclosed herein may provide one or more of the following advantages over prior art inertial igniters:

provide inertial igniters that are compact, safe and can differentiate no-fire conditions from all-fire conditions based on the prescribed all-fire setback acceleration level (target impact acceleration level when used for target impact activation) and its prescribed duration;

provide compact inertial igniters that do not require additional volume around them when integrated into thermal reserve or other reserve batteries or in initiation trains;

provide compact inertial igniters that allow the use of standard off-the-shelf percussion cap primers or commonly used one part or two-part pyrotechnic components;

provide inertial igniters that can be sealed to simplify storage and to increase shelf life.

Accordingly, a compact inertial igniter is provided. The inertial igniter comprising: a striker mass movable towards one of a percussion cap or pyrotechnic material; and a striker mass release mechanism for releasing the striker mass to strike the percussion primer or pyrotechnic material upon experiencing a prescribed acceleration magnitude and its duration thresholds.

The striker mass release mechanism further comprises biasing members, such as helical springs, for biasing the striker mass to demand a prescribed all-fire release acceleration level.

The compact inertial igniter striker mass and the release mechanism are readily tuned to modify all-fire and no-fire acceleration and duration thresholds.

The striker mass release mechanism is returnable from the path of releasing the striker mass when the acceleration duration and magnitude (all-fire condition) threshold is not reached.

Also provided is a method for initiating a thermal battery. The method comprising: releasing a striker mass upon an acceleration magnitude and duration greater than a prescribed threshold; and accelerating the striker mass by the applied acceleration to gain enough kinetic energy to strike and initiate the provided percussion cap or pyrotechnic material.

The method can further comprise returning the striker mass release mechanism to its original (zero acceleration condition) position when the acceleration duration and magnitude (all-fire condition) threshold is not reached.

It is appreciated by those skilled in the art that the disclosed compact inertial igniter mechanisms may also be used to construct electrical impulse switches, which are activated like the so-called electrical G switches but with the added time delays to account for the activation shock level duration requirement, i.e., similar to the disclosed compact inertial igniters to activate when a prescribed shock loading (acceleration) level is experienced for a prescribed length of time (duration). The electrical "impulse switches" may be configured as normally open or closed and with or without latching mechanisms. Such impulse switch embodiments that combine such safety mechanisms with electrical switching mechanisms are described herein together with alternative methods of their construction.

A need therefore exists for miniature impulse switches for use in munitions or the like that can differentiate accidental short duration shock loading (so-called no-fire events for munitions) from generally high but longer duration, i.e., high impulse threshold levels, that correspond to all-fire conditions in gun fired munitions or the like. Such impulse switches must be very small in size and volume to make them suitable for being integrated into electronic circuit boards or the like. They must also be readily scalable to different all-fire and no-fire conditions for different munitions or other similar applications. Such impulse switches must be safe and should be able to be configured to activate at prescribed acceleration levels when subjected to such accelerations for a specified amount of time to match the firing acceleration experienced in a gun barrel as compared to high G accelerations experienced during accidental falls or other similar events which last over very short periods of time, for example accelerations of the order of 500 Gs when applied for 10 msec as experienced in a gun as compared to 2000 G acceleration levels experienced during accidental fall over a concrete floor but which may last only 0.5 msec. Reliability is also of much concern since most munitions are required to have a shelf life of up to 20 years and could generally be stored at temperatures of sometimes in the range of −65 to 165 degrees F. This requirement is usually satisfied best if the device is in a sealed compartment. The impulse switch must also consider the manufacturing costs and simplicity of configuration to make it cost effective for munitions applications.

Those skilled in the art will appreciate that the compact impulse-based mechanical impulse switches disclosed herein may provide one or more of the following advantages over prior art mechanical G-switches:

provide impulse-based G-switches that are small in both height and volume, thereby making them suitable for mounting directly on electronic circuit boards and the like;

provide impulse-based switches that differentiate all-fire conditions from all no-fire conditions, even those no-fire conditions that result in higher levels of shock but short duration, thereby eliminating the possibility of accidental activation;

provide impulse switches that are modular in configuration and can therefore be readily customized to different no-fire and all-fire requirements;

provide impulse switches that may be normally open or normally closed and that are modular in configuration and can be readily customized for opening or closing or their combination of at least one electric circuit.

Accordingly, impulse-based impulse switches with modular configuration for use in electrical or electronic circuitry are provided that activate upon a prescribed acceleration profile threshold. In most munition applications, the acceleration profile is usually defined in terms of firing setback acceleration and its duration.

A need therefore exists for miniature mechanical inertial igniters for reserve batteries, such as thermal or liquid reserve batteries used in gun-fired munitions, mortars, rockets, and the like, such as for small reserve batteries that could be used in fuzing and other similar applications, that are safe, i.e., satisfy the munitions no-fire conditions, and that can be used in applications in which the setback acceleration level is relatively low.

Such compact inertial igniters can also be scalable to reserve batteries of various sizes, such as to miniaturized inertial igniters for small size reserve batteries. The inertial igniters are also generally required to withstand high firing accelerations, for example up to 20-50,000 Gs, i.e., not to damage the battery; and should be able to be configured to ignite at specified acceleration levels when subjected to such accelerations for a specified amount of time to match the firing acceleration.

To ensure safety and reliability, inertial igniters should not initiate during acceleration events which may occur during manufacture, assembly, handling, transport, accidental drops, etc. Additionally, once under the influence of an acceleration profile particular to the intended firing, i.e., a prescribed firing acceleration level and its duration threshold, the device should initiate with high reliability. It is also conceivable that the igniter will experience incidental low but long-duration accelerations, whether accidental or as part of normal handling, which must be guarded against initiation.

BRIEF DESCRIPTION OF THE DRAWINGS

These and other features, aspects, and advantages of the apparatus will become better understood with regard to the following description, appended claims, and accompanying drawings where:

DETAILED DESCRIPTION

The compact inertial igniters are herein described through the following examples of their application.

Figure 1:
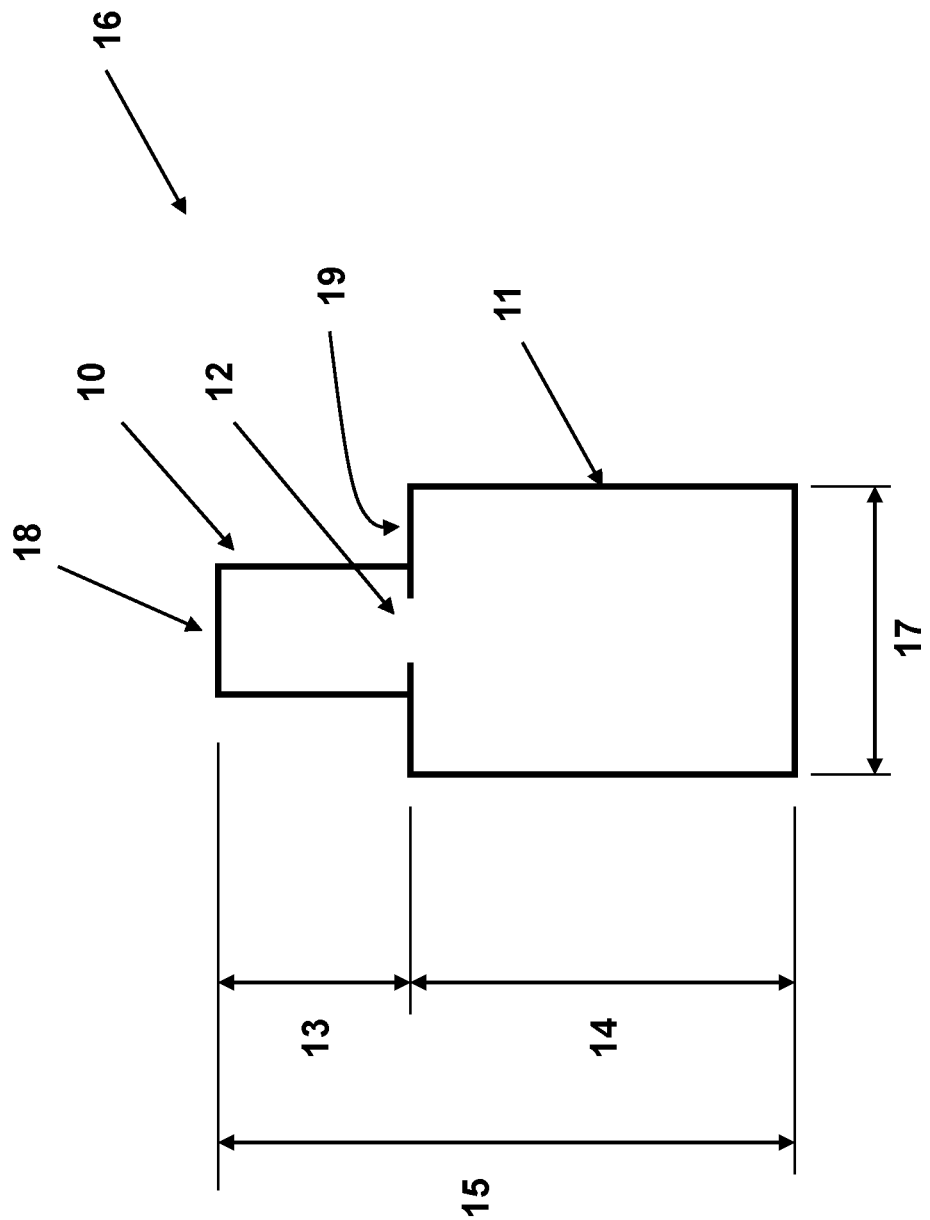
FIG. 1 illustrates a schematic of a cross-section of a thermal battery and inertial igniter assembly of the prior art.
Figure 2:
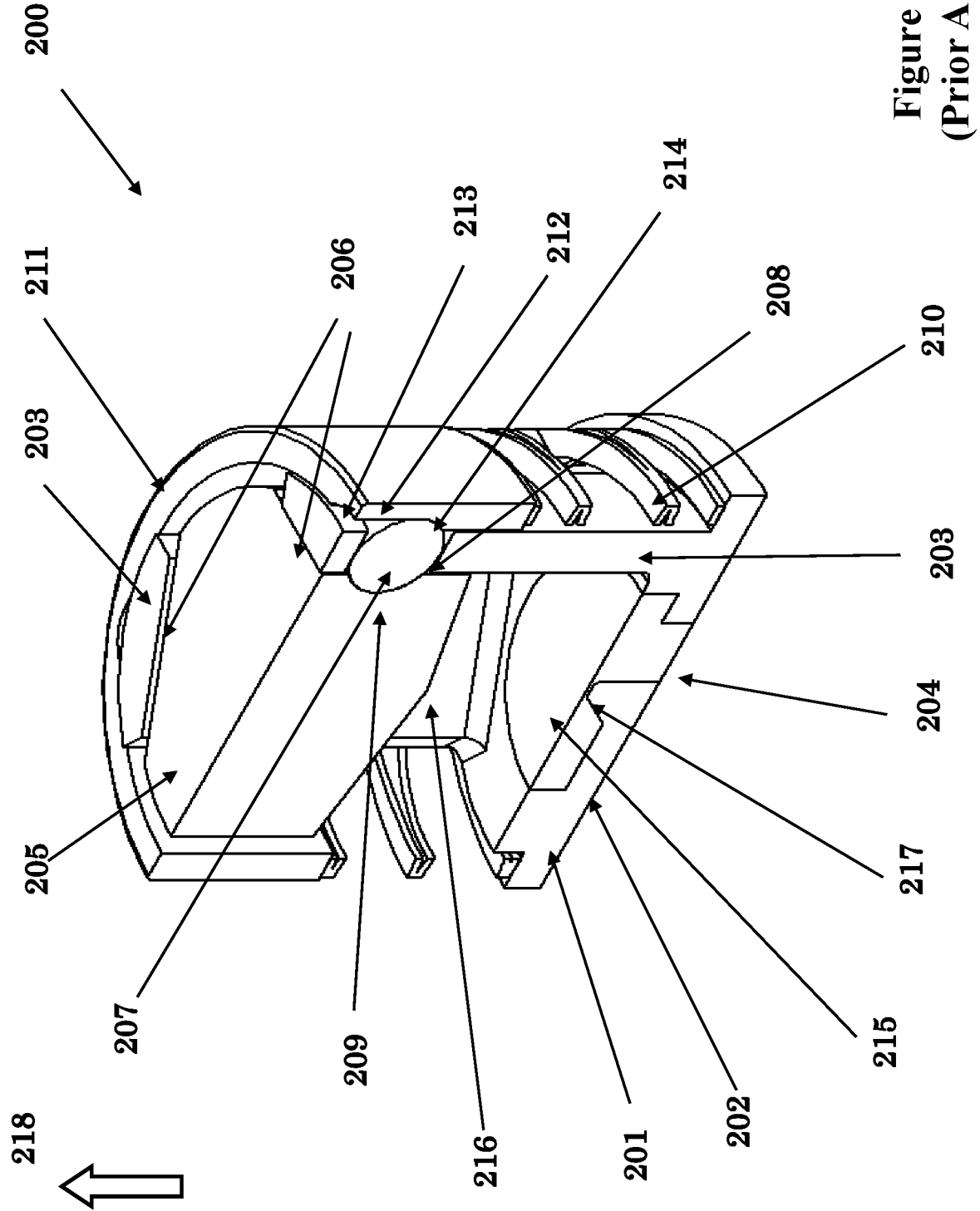
FIG. 2 illustrates a schematic of a cross-section of an inertial igniter for thermal battery of the prior art.
Figure 3:
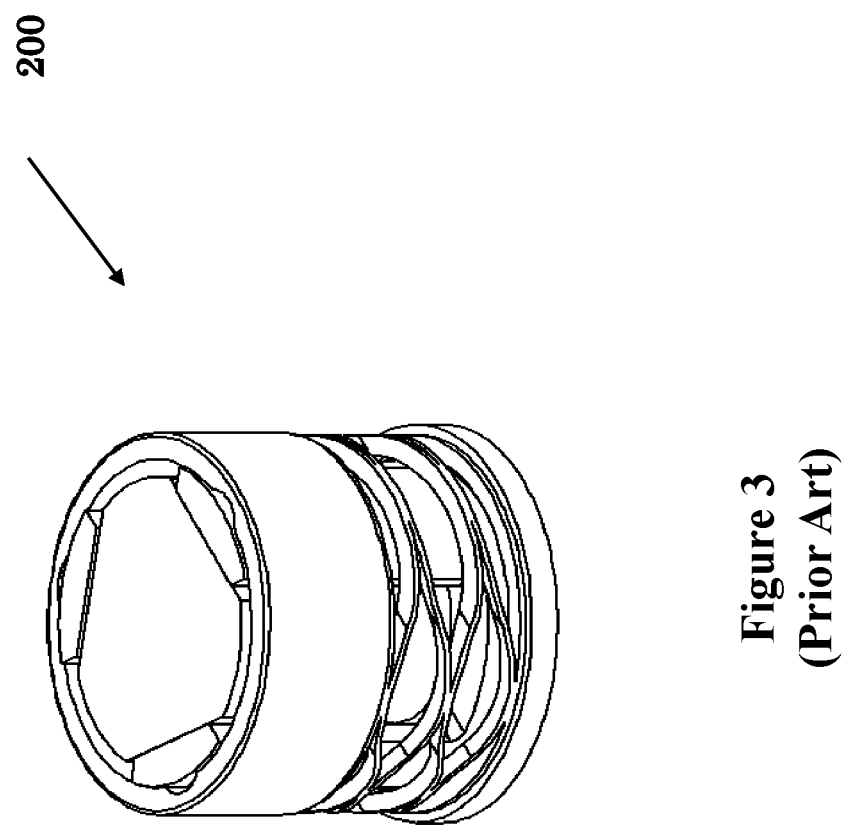
FIG. 3 illustrates a schematic of the isometric drawing of the inertial igniter for thermal battery of FIG. 2.
Figure 4:
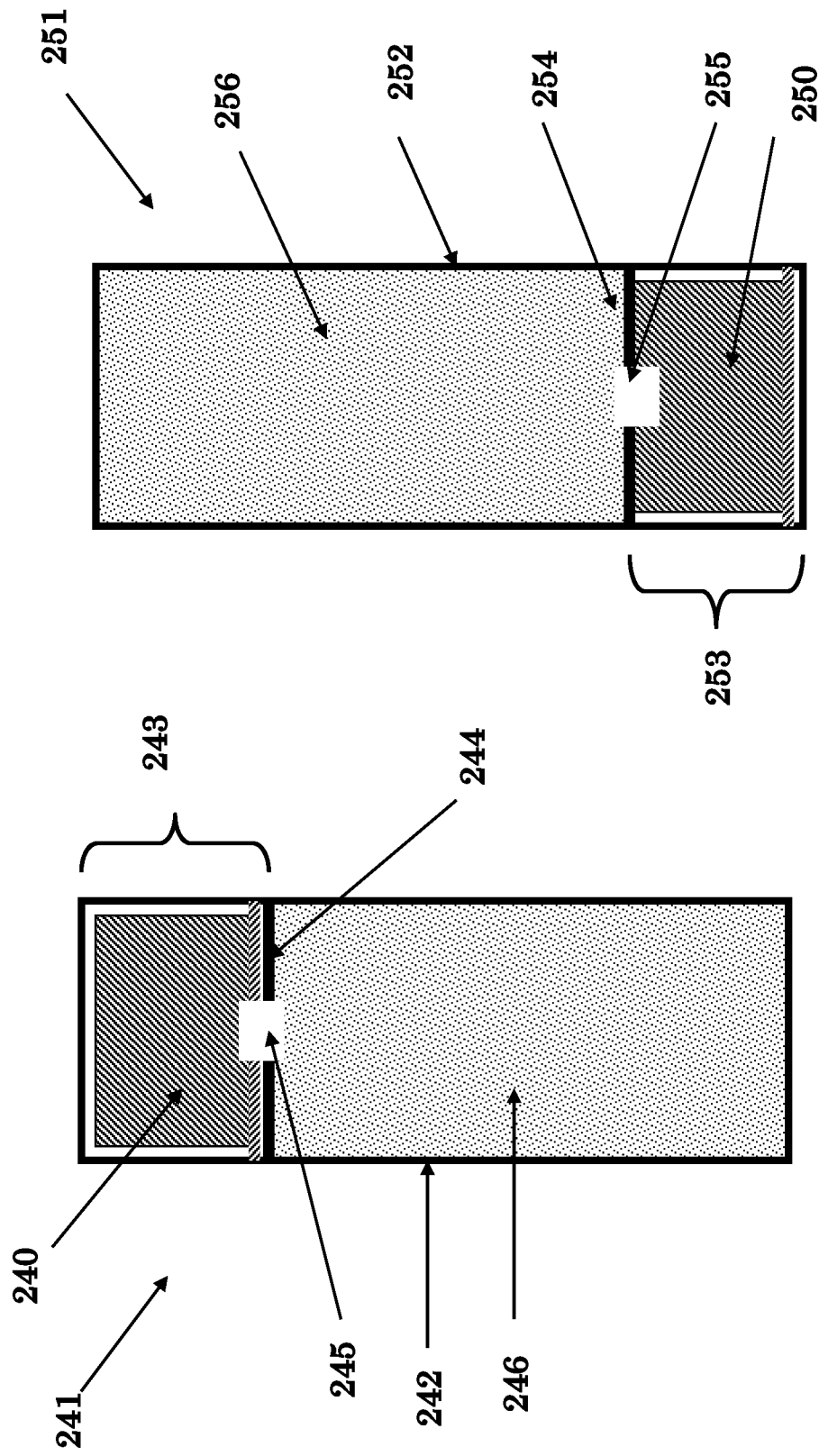
FIG. 4a illustrates a schematic of a cross-section of a thermal battery of the prior art with an inertial igniter positioned on the top portion of the thermal battery and in which the ignition generated flame to be directed downwards into the thermal battery compartment.
FIG. 4b illustrates a schematic of a cross-section of a thermal battery of the prior art with an inertial igniter positioned on the bottom portion of the thermal battery and in which the ignition generated flame to be directed upwards into the thermal battery compartment.
Figure 5:
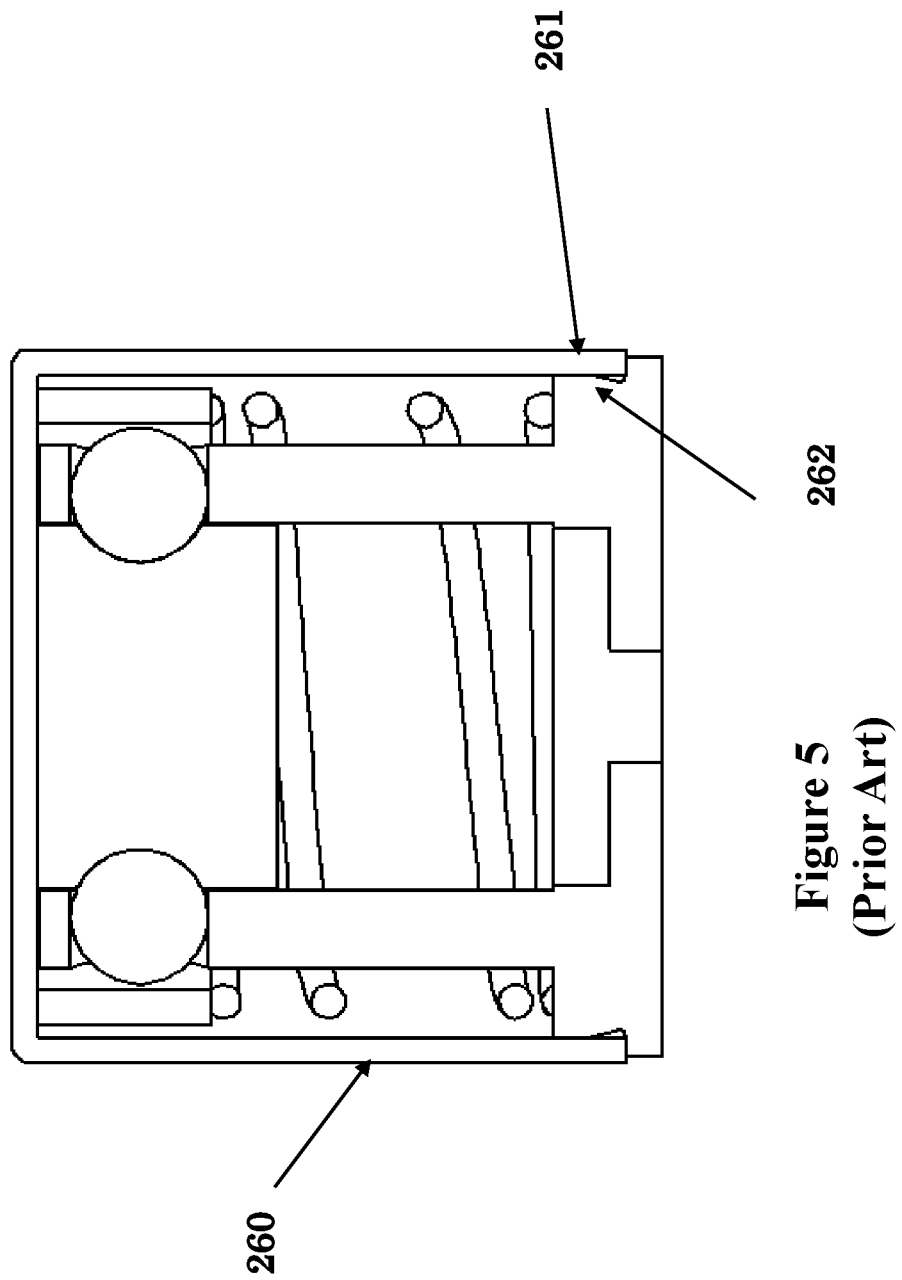
FIG. 5 illustrates a schematic of cross-section of an inertial igniter for thermal battery of the prior art with an outer housing.
Figure 6:
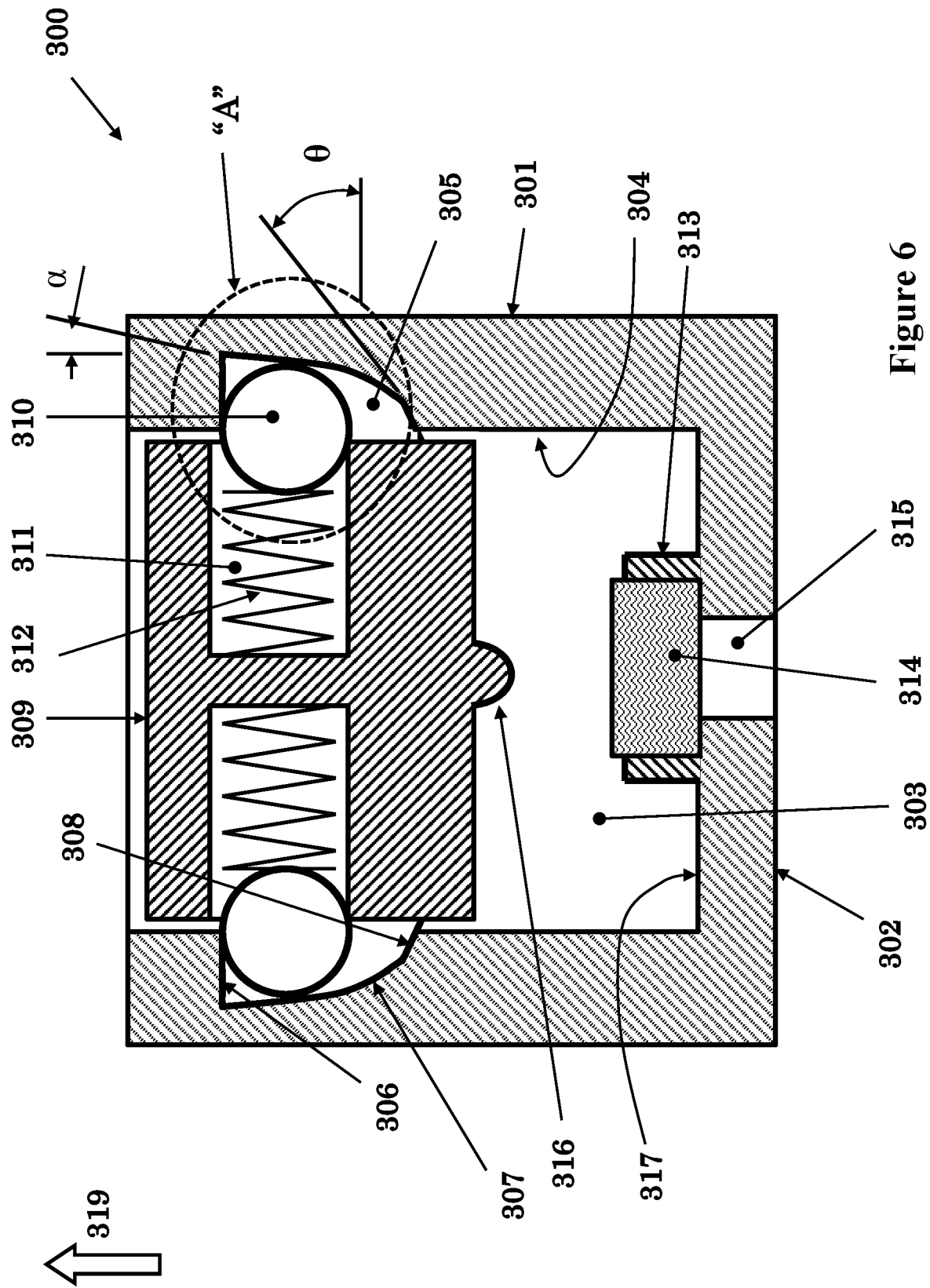
FIG. 6 illustrates the schematic of the cross-sectional view of the first embodiment compact inertial igniter.
Figure 7:
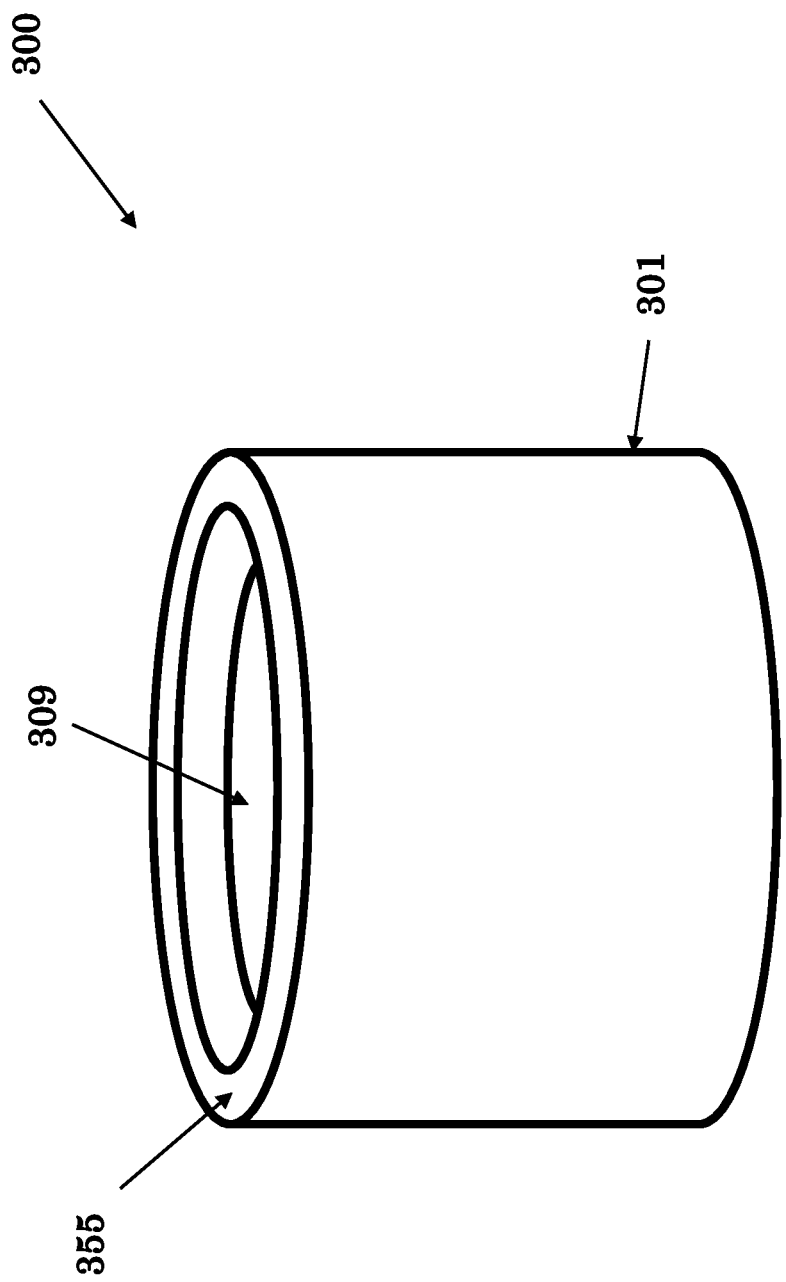
FIG. 7 illustrates the isometric view of the compact inertial igniter embodiment of FIG. 6.

The schematic of the cross-sectional view of the first embodiment compact inertial igniter 300 is shown in FIG. 6. The isometric view of the compact inertial igniter 300 is shown in FIG. 7.

The compact inertial igniter 300 is constructed with a cylindrical igniter body 301 with the bottom 302, leaving a cylindrical space 303 inside the body of the compact inertial igniter. Around the inside wall 304 of the compact inertial igniter body 301 is provided a continuous groove 305, which consists of a "top" surface 306, a "sidewall" 307 and a "bottom" surface 308 as can be seen in FIG. 6. The bottom surface 308 has a linear cross-section as can be seen in FIG. 6, which is inclined relative to a plane normal to the central axis of the cylindrical body 301, with which it makes the angle θ.

The compact inertial igniter 300 is also provided with the striker mass 309, which can be cylindrical and is provided with a relatively small clearance with the wall 304, so that it could slide up and down freely inside the cylindrical space 303 within the igniter body 301, unless it is prevented from free up or down translation by the at least one "locking" balls 310.

The striker mass 309 is provided with at least one cylindrical pocket 311, within each a ball 310 and a preloaded compressive spring 312 is provided. In general, at least three such pockets can be provided symmetrically in a plane perpendicular to the axis of symmetry of the striker mass 309.

It is appreciated that in the schematic of FIG. 6 the compact inertial igniter 300 is shown in its pre-activation state. In this state of the compact inertial igniter 300, the preloaded compressive springs 312 can be seen to have forced the balls 310 against the outwardly shaped surface 307, FIG. 6, thereby displacing the striker mass upward to the point at which the balls 310 rest against the top surface 306 of the groove 305.

As can be seen in the schematic of FIG. 6, the body 301 of the compact inertial igniter 300 is also provided with a pocket 313 on the bottom surface 317 inside the space 303, within which a percussion primer 314 is properly assembled. The bottom surface 302 of the compact inertial igniter 300 is also provided with a small hole 315 (usually around 2 mm in diameter) to allow the flame and sparks generated by the initiation of the percussion primer 314 to exit. The striker mass 309 is provided with a properly sized sharp tip 316, which is positioned to strike and initiate the percussion primer with the required velocity.

An operation of the embodiment 300 of the inertial igniter of FIGS. 6 and 7 is now described. In case of any relatively low magnitude acceleration in the axial direction, i.e., in the direction of the arrow 319, which would overcome the resisting force of the preloaded compressive springs 312, it would initiate a relatively small downward motion of the striker mass. Here, relatively low magnitude acceleration is intended to mean acceleration levels that the preloaded compressive springs 312 would support and only allow for downward motion of the striker mass 309 until the balls 310 reach the bottom surface 308 of the groove 305 and can be calculated as follows.

Figure 8:
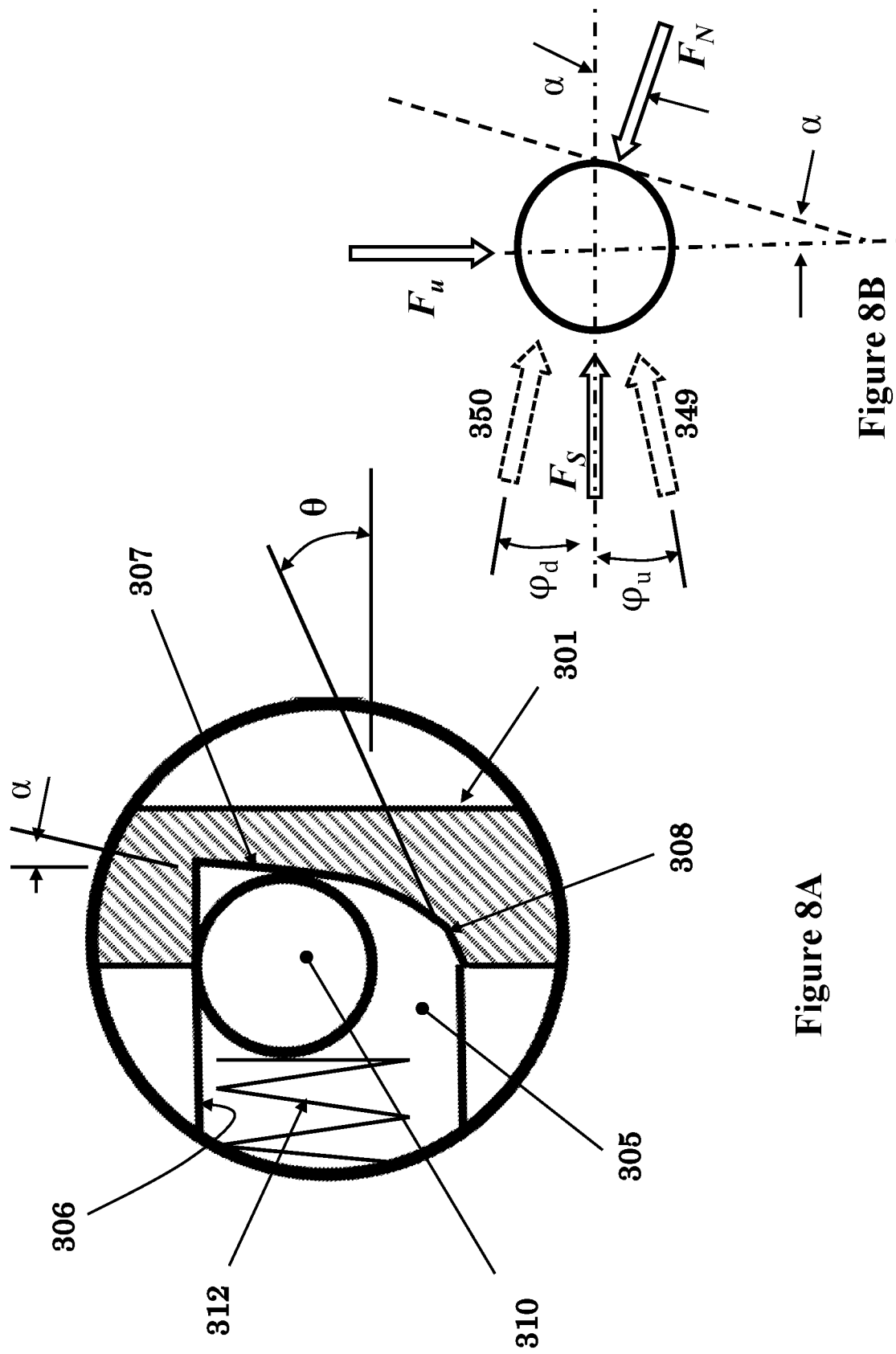
FIG. 8A illustrates the blow-up view "A" of FIG. 6 for describing the forces acting on the various components of the inertial igniter at rest or as it is being subjected to axial acceleration.
FIG. 8B illustrates the free-body-diagram of the inertial igniter locking ball for force analysis while the inertial igniter is at rest.

It is appreciated by those skilled in the art that when the compact inertial igniter 300 is at rest, the pressure of the balls 310 over the surface 307 of the groove 305 due to the force preloaded compressive spring force $F_S$ would result in an upward component on an $F_u$ from the reaction force at the contact point between the wall and the surface 307 of the groove 305 due to the initial inclination angle $\alpha$ between the surface 307 and vertical direction as seen in FIG. 6, the region of which is redrawn in the blow-up view of FIG. 8A.

The free-body-diagram of the ball 310 is provided in FIG. 8B (the striker mass 309 is not shown in the free-body-diagram for clarity) to show the forces acting on the ball while the compact inertial igniter 300 is at rest. As can be seen in FIG. 8B, the presence of the preloaded compressive spring force $F_S$ results in a reaction normal force $F_N$ at the contact surface between the ball 310 and the surface 307 of the groove 305. The normal reaction force $F_N$ is readily seen as dependent on the angle $\alpha$ and given as $$F_N = \frac{F_S}{Cos\alpha} \tag{1}$$

The reaction force $F_u$ is then seen to become $$F_u = F_N Sin\alpha = \frac{F_S Sin\alpha}{Cos\alpha} = F_S tan\alpha \tag{2}$$

Now when the compact inertial igniter 300 begins to be subjected to an increasing acceleration in the direction of the arrow 319, FIG. 6, the acceleration acts on the effective assembled mass of the striker mass 309, which includes the mass contribution of the springs 312 and the balls 310, thereby exerting a dynamic force $F_D$ (in opposite direction to the force $F_u$, FIG. 8B) as $$F_D = ma \tag{3}$$

where m is the effective mass of the striker mass 309 assembly with the springs 312 and balls 310 and a is the acceleration of the compact inertial igniter 300 in the direction of the arrow 319.

Then as the level of the acceleration a in the direction of the arrow 319 is increased, then at an acceleration level $a_{min}$ given by equation (4), the reaction force $F_u$ is reduced to zero and with any further increase in the acceleration a, the striker mass 309 assembly would begin to slide down as view in FIG. 6.

$$a_{min} = \frac{F_u}{m} \tag{4}$$

With increasing level of acceleration beyond the level $a_{min}$, equation (4), the striker mass 309 assembly begins to displace down with increasing velocity, during which time the balls 310 would be rolling/sliding over the surface 307 of the groove 305 as the spring force $F_S$ and therefore the normal reaction force $F_N$ increase due to further compression of the springs 312 due to the inclination angle $\alpha$.

Figure 9:
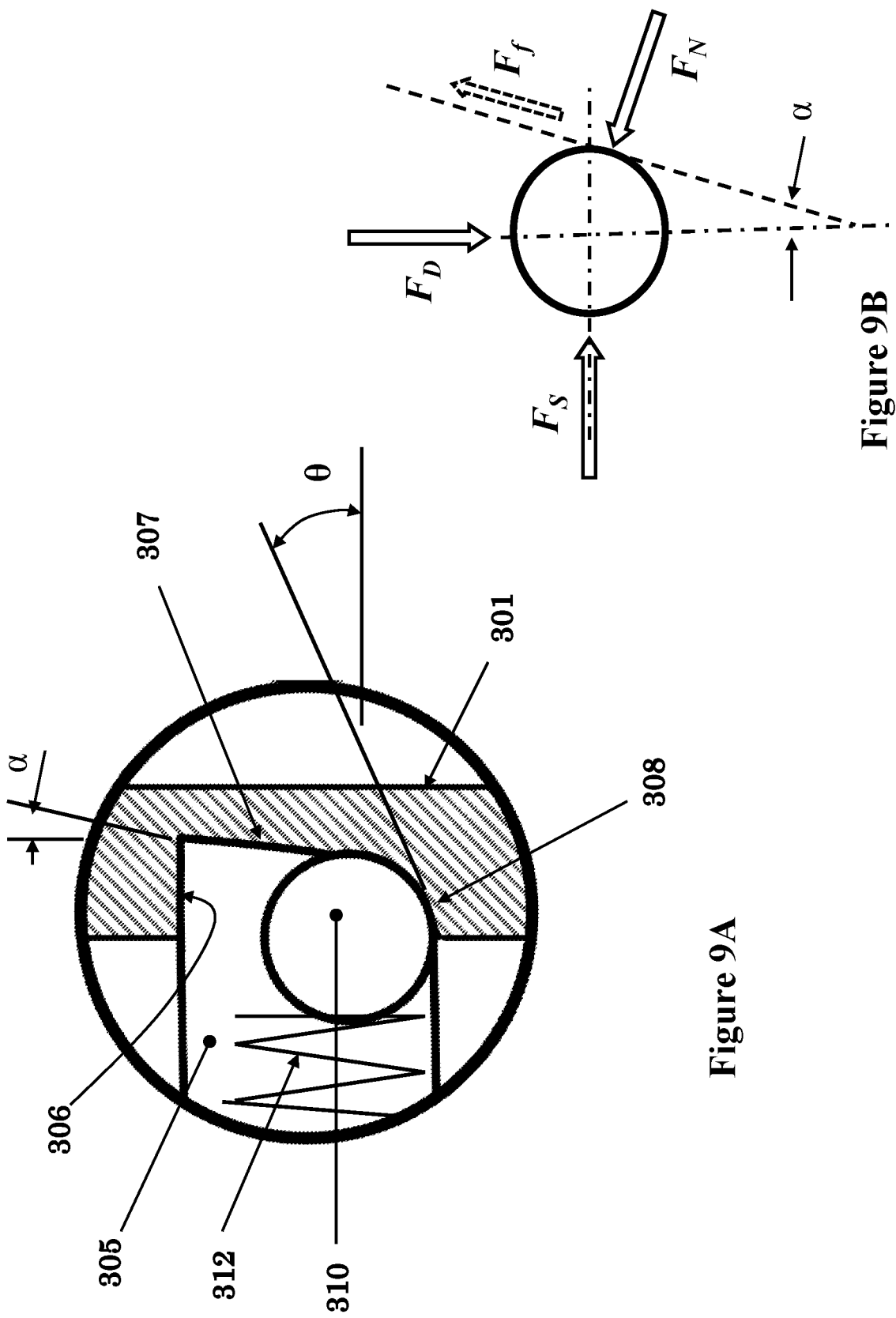
FIG. 9A illustrates the blow-up view "A" of FIG. 6 for describing the forces acting on the various components of the inertial igniter after being subjected to axial acceleration that causes the igniter locking balls impacting the bottom surface of the provided groove.
FIG. 9B illustrates the free-body-diagram of the inertial igniter locking ball for dynamic analysis.

It is appreciated that while the striker mass 309 is displacing down and before the balls 310 strike the bottom surface 308 of the groove 305, the forces acting on the balls 310, FIG. 9B (the striker mass 309 is not shown in the free-body-diagram for clarity), and the downward acceleration of the balls 310 relative to the inertial igniter housing 301, thereby the downward acceleration of the striker mass relative to the inertial igniter housing 301, are calculated as follow.

Assuming pure rolling of the balls 310 over the surface 307 of the groove 305, the normal force $F_N$ is given by equation (1) and the dynamic force $F_D$ is given by equation (3), therefore from the balance of the sum of all forces in the vertical direction, i.e., in the direction of the inertial igniter acceleration, FIG. 9B, we get $$F_D - F_N Sin\alpha = ma_{B/I} \tag{5}$$

where $a_{B/I}$ is the acceleration of the balls 310 and therefore the striker mass 309 assembly relative to the compact inertial igniter housing 301, i.e., relative to the device to which the inertial igniter is rigidly attached. By substituting $F_N$ and $F_D$ from equations (1) and (3) into equation (5), the acceleration $a_{B/I}$ of the balls 310 and therefore the striker mass 309 assembly relative to the compact inertial igniter housing 301 becomes $$a_{B/I} = a - \frac{F_S tan\alpha}{m} \tag{6}$$

It is appreciated by those skilled in the art that if during downward displacement of the striker mass 309 the balls 310 do not undergo pure rolling over the surface 307 of the groove 305 and is thereby also sliding over the surface 307 and that there are other frictional forces acting on the balls 310 against their points of contact with the surfaces of the pockets 311 and their contacts with the preloaded compressive springs 312, then they would also have an effect that is the same as the effect of the spring force $F_S$ in reducing the acceleration am of the acceleration of the balls 310 and therefore the striker mass 309 assembly relative to the compact inertial igniter housing 301. For example, by only considering only the sliding friction force $F_f$, FIG. 9B, of the balls 310 over the surface 307 of the groove 305 and neglecting the usually negligible other indicated friction forces, then the acceleration am is reduced by the amount $F_f/m$ to $$a_{B/I} = a - \frac{F_S \tan\alpha + F_f}{m} \quad (7)$$

Now if the acceleration in the direction of the arrow 319, FIG. 6, is relatively short duration even if it is relatively high in magnitude, before the balls 310 reach the bottom surface 308 of the groove 305, FIGS. 6 and 9A, the striker mass 309 comes to a stop and displaced back to its rest position of FIG. 6 by the upward component of the preloaded compressive spring force $-F_u$ (opposite direction to the reaction force $F_u$), equation (2). The compact inertial igniter 300 can therefore be configured to accommodate, i.e., not activate, when subjected to relatively low magnitude accelerations, such as those experienced during transportation, and short duration and higher accelerations such as accidental drops from relatively low heights.

Figure 10:
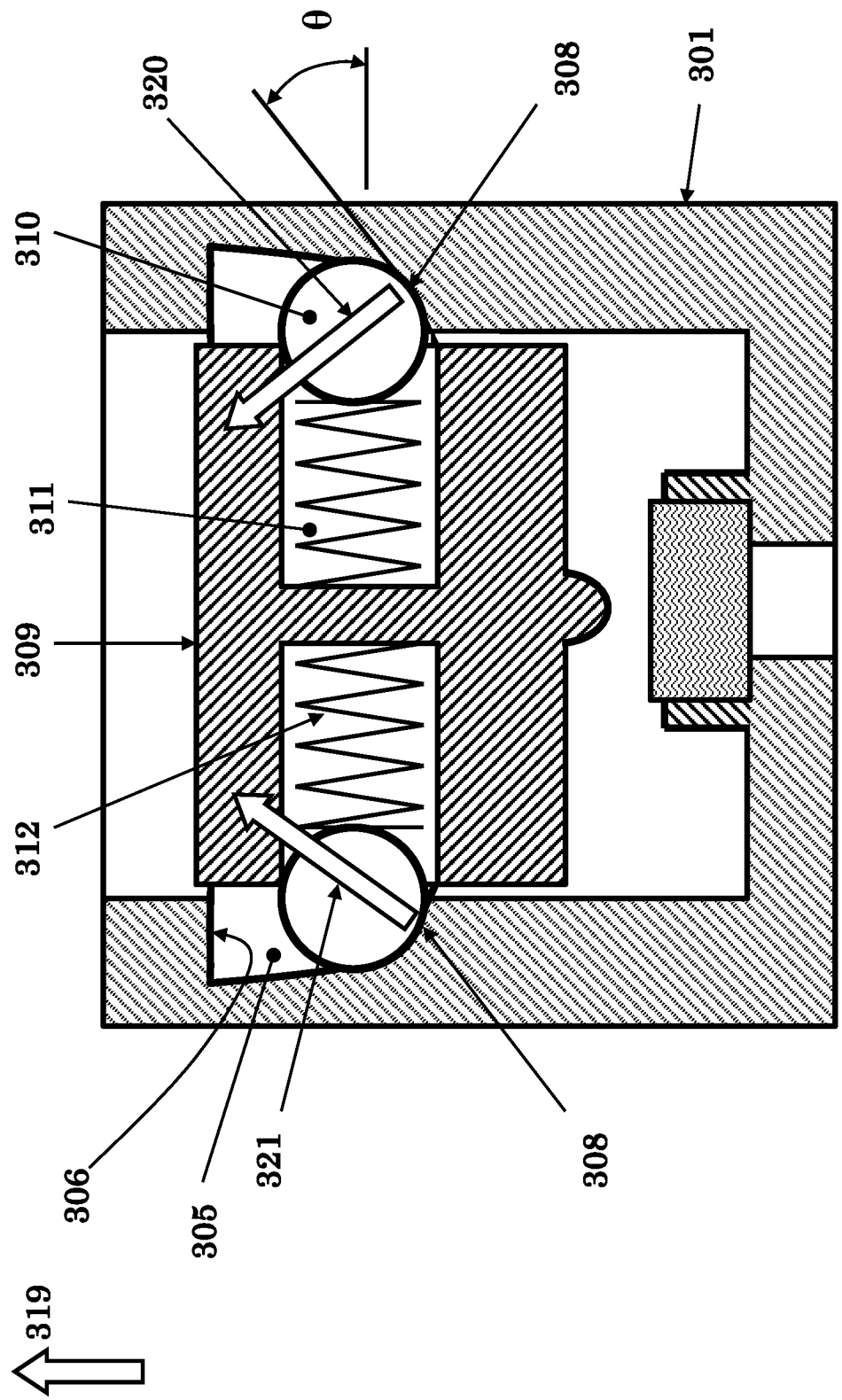
FIG. 10 illustrates the schematic of the cross-sectional view of the first embodiment compact inertial igniter of FIG. 6 as it is being subjected to axial acceleration.

However, if the acceleration in the direction of the arrow 319 has high enough magnitude and long enough duration, the striker mass 309 would be accelerated downward and gain speed until the balls 310 impact the surface 308 as shown in FIGS. 9A and 10. The impact of the balls 310 with the inclines surface 308 (with the angles θ as indicated in FIGS. 6, 9A and 10) would cause the balls 310 to "bounce" back in the direction normal to the surface 308, i.e., initially in the direction of the arrows 320, 321 as shown in FIG. 10. As a result, the striker mass 309 assembly would "bounce" back upwards in the direction of the arrow 319, i.e., the applied acceleration.

It is appreciated that due to the first such impact, the striker mass 309 assembly (which includes the balls 310 and the springs 312) would begin to move upwards as viewed in FIG. 10 essentially at the projection of the impact rebounding velocity in the direction of the arrow 320, 321. It is appreciated by those skilled in the art that the impact rebounding velocity is dependent on the mass of the striker mass 309 assembly and the coefficient of restitution characteristics of the striker body 301 at the impact surface 308. It is also appreciated by those skilled in the art that the component of the velocity of the balls 310 in the direction of further compressing the compressive springs 312 and related kinetic energy transferred to the springs as potential energy and friction losses between the balls and the surface of the cylindrical pockets 311 housing the springs 312 must be considered in determining the profile of the speed with which the striker mass 309 is going to displace upwards.

Now if the acceleration in the direction of the arrow 319 ceases shortly after the above described balls 310 impact with the (inclined) surface 308, if the resulting rebounding velocity of the striker mass 309 assembly is high enough, then the striker mass assembly would travel upward until the balls 310 impact the upper surface 306 of the groove 305, FIGS. 9A and 10, and bounce downward with a certain velocity that is again determined by the total mass of the striker mass 309 assembly and the coefficient of restitution between the two impacting objects, i.e., the striker mass with its impacting balls 310 and the surface 306 of the compact inertial igniter body 301. Otherwise, the striker mass 309 assembly move up and the spring force $F_S$ would eventually bring it to a stop with the balls 310 resting against the surface 306, i.e., in the compact inertial igniter rest position shown in FIG. 6.

Now if the above acceleration in the direction of the arrow 319 persists and is high enough, i.e., is higher than the prescribed minimum all-fire acceleration level and duration (when used in munitions), the balls 310 will impact the top surface 306 of the groove 305, rebound downwards and depending on its rebounding speed, may impact the surface 308 a second time and eventually after one or more up and down rebounding against the surfaces 308 and 306 of the groove 305 it would essentially "settle" over the surface 308 and is pushed inside the spring pockets 311 while being sliding down the surface 308 due to the dynamic force $F_D$, FIG. 9B, which tends to push the balls 310 inside the pockets 311, i.e., outside the groove 305 space, and thereby freeing the slider mass 309 assembly from engagement with the groove 305 of the housing 301 and to begin to be accelerated downwards. The striker mass 309 is then accelerated downward and gain further velocity, thereby kinetic energy. The striker mass 309 sharp tip 316 would then strike the percussion primer 314 and initiates it if the striker mass 309 has gained the requisite kinetic energy.

In the embodiment 300 of FIG. 6, following initiation of the percussion primer 314 (or the provided pyrotechnics compound), the generated flames and sparks are configured to exit downward through the opening 315 to initiate the thermal (or liquid) reserve battery below or initiate an initiation train and the like. Alternatively, side ports may be provided to allow the flame to exit from the side of the compact inertial igniter to initiate the pyrotechnic materials (or the like) of a thermal reserve battery or the like that is positioned around the body of the inertial igniter. Other alternatives known in the art may also be used.

It is appreciated by those skilled in the art that by varying the mass of the striker 309; the spring rate and preload level of the springs 312; the height and angles α and θ of the groove 305; and the distance between the tip 316 of the striker mass 309 and the percussion primer 314, the disclosed compact inertial igniter 300 can match the prescribed all-fire minimum acceleration magnitude and duration and the no-fire requirements for various applications and safety protection, such as against accidental dropping of the compact inertial igniter and/or the munitions or the like within which it is assembled. It is appreciated that to provide the requisite impact energy, the striker mass 309 assembly the separation distance between the tip 316 of the striker mass and the percussion primer 314 must work together to provide the specified impact energy to initiate the percussion primer when subjected to the remaining portion of the prescribed initiation acceleration profile after the balls 310 have cleared the groove 305.

It is appreciated by those skilled in the art that the compact inertial igniter embodiment 300 of FIG. 6 is intended to be assembled and held firmly in reserve batteries or any other component of a munition or the like. It is, therefore, appreciated that if the munition in which the compact inertial igniter is assembled undergoes spinning during the firing, then since the groove 305 in the inertial igniter housing 301 is provided around the entire inner surface of the inertial igniter housing, then the balls 310 provide minimal resistance to the striker mass 309 from spinning (rotating) relative to the compact inertial ignite housing 301. In many applications, such as when the munition spin acceleration in the barrel is very high, such high spin acceleration of the striker mass 309 relative to the inertial igniter housing 301 is not desirable since it could cause damage to the groove 305 and the striker mass and interfere with the proper operation of the inertial igniter as was previously described. The cross-sectional view of a modified compact inertial igniter embodiment 300 the prevents spinning of its striker mass relative to the inertial igniter housing is shown in FIG. 11 and is indicated as the compact inertial igniter embodiment 325.

Figure 11:
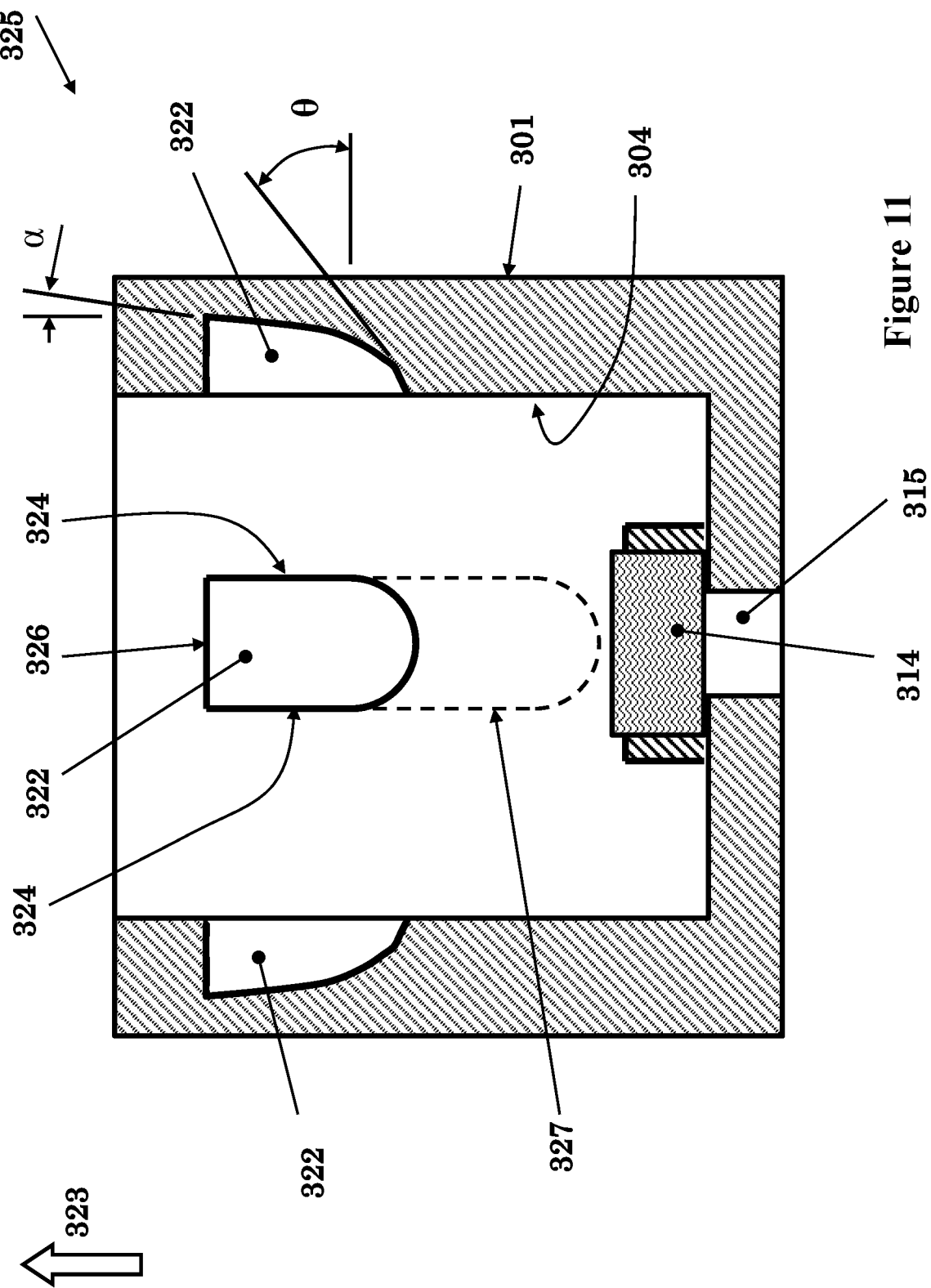
FIG. 11 illustrates the schematic of the cross-sectional view of a modified compact inertial igniter embodiment of FIG. 6 that is configured to prevent spinning of the inertial igniter striker mass in it housing.

It is noted that all components and features of the compact inertial igniter embodiment 325 of FIG. 11 are identical to those of the embodiment 300 of FIG. 6 except those related to the groove 305, and the identical components and features are identified by the same numerals. The inertial igniter embodiment 300 housing with the modified groove is still indicated by the same numeral 301.

Figure 12:
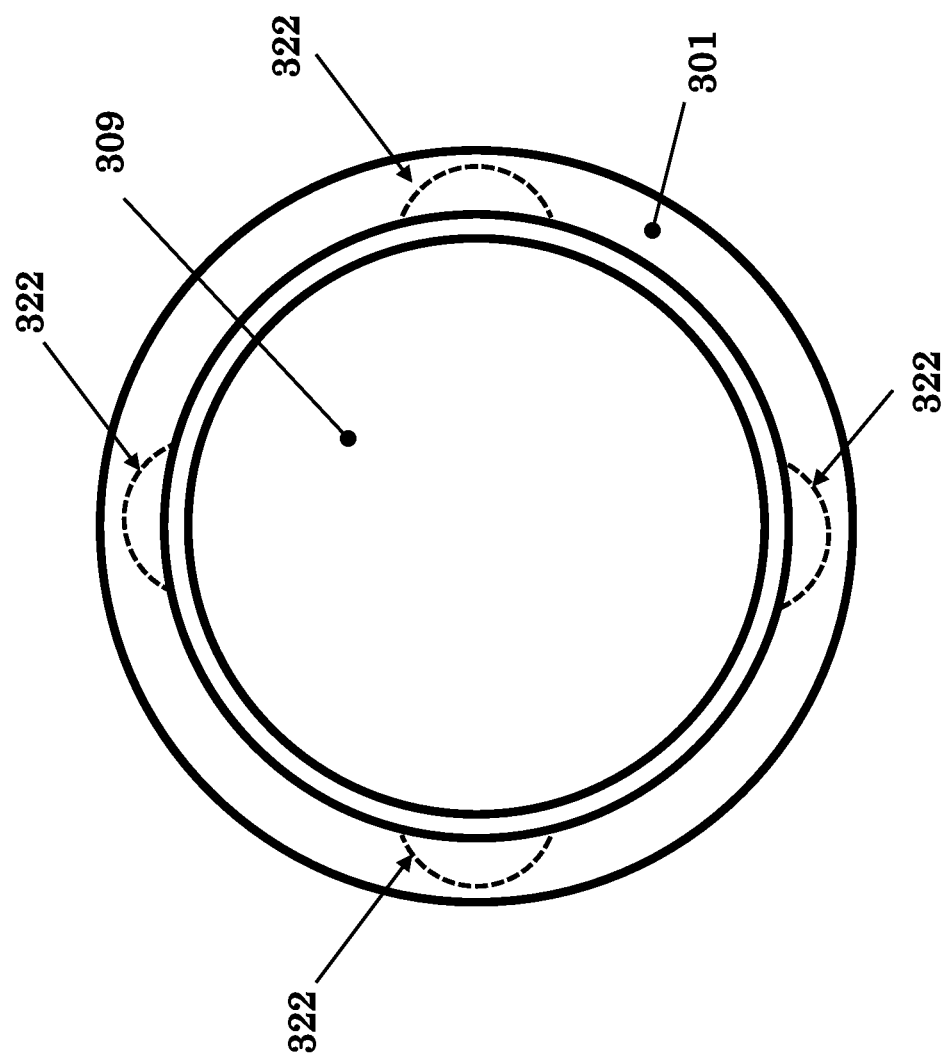
FIG. 12 illustrates the top view of the modified compact inertial igniter embodiment of FIG. 11.

In the modified compact inertial igniter embodiment 325, unlike the embodiment 300 of FIG. 6 in which the cavity 305 is provided over the entire inner surface 304 of the inertial igniter housing 301, they are provided with separate "groove pockets" 322 of the same central cross-sectional areas as the groove 305 of embodiment 300 but limited in width to accommodate each a single ball 310 as shown in FIG. 11 and its top view of FIG. 12, in which top views of four groove pockets are shown with dashed lines.

In the schematics of FIGS. 11 and 12, the compact inertial igniter embodiment 325 are assumed to have four symmetrically positioned groove pockets to accommodate engaging balls as described for the compact inertial igniter embodiment 300 of FIG. 6. However, it is appreciated by those skilled in the art that depending on the size of the striker mass 309 and the housing 301 and the balls 310, the inertial igniter can be provided with more or even fewer number of such groove pockets as long as there is room to accommodate them. It is, however, appreciated that for the sake of stability of striker mass movement, at least three symmetrically positioned groove pockets with proper engaging balls are generally desired to be provided.

It is appreciated that the cross-sectional view of an assembled modified compact inertial igniter embodiment 325 of FIG. 11 with four symmetrically provided groove pockets 322 looks exactly like the cross-sectional view of the compact inertial igniter embodiment 300 of FIG. 6. The compact inertial igniter embodiment 325 also operates as was described previously for the embodiment 300 when subjected to acceleration in the direction of the arrow 323 (319 in FIG. 6) corresponding to prescribed minimum acceleration magnitude and duration (all-fire condition in munitions) and other accidental accelerations (no-fire conditions in munitions). The only difference between the two embodiments 325 and 300 being that in the inertial embodiment 325, the balls 310 can only travel up and down in the groove pockets 322 as they are constrained by the walls 324 of the groove pockets from displacing in the lateral directions. Thereby the striker mass 309 is prevented from rotating (spinning) relative to the inertial igniter housing 301 while the balls 310 are inside the groove 305 when the inertial igniter is subjected to spinning acceleration, which is not the case for the compact inertial igniter embodiment 300 of FIG. 6.

It is appreciated that in the compact inertial igniter embodiment 325, FIG. 11, once the balls 310 have cleared the grove pockets 322 under acceleration in the direction of the arrow 323, the striker mass 309 is free to rotate (spin) relative to the inertial igniter housing 301 as it travels down towards the percussion primer. In certain application, however, it might be desirable to prevent such rotational motion of the striker mass 309. This is ready accomplished by extending one or more of the groove pockets 322 further down (as shown with dashed lines in FIG. 11 and indicated by the numeral 327) to or past the point at which the engaging ball(s) 310 would be after the tip 316 of the striker mass 309 has impacted the percussion primer 314.

Figure 13:
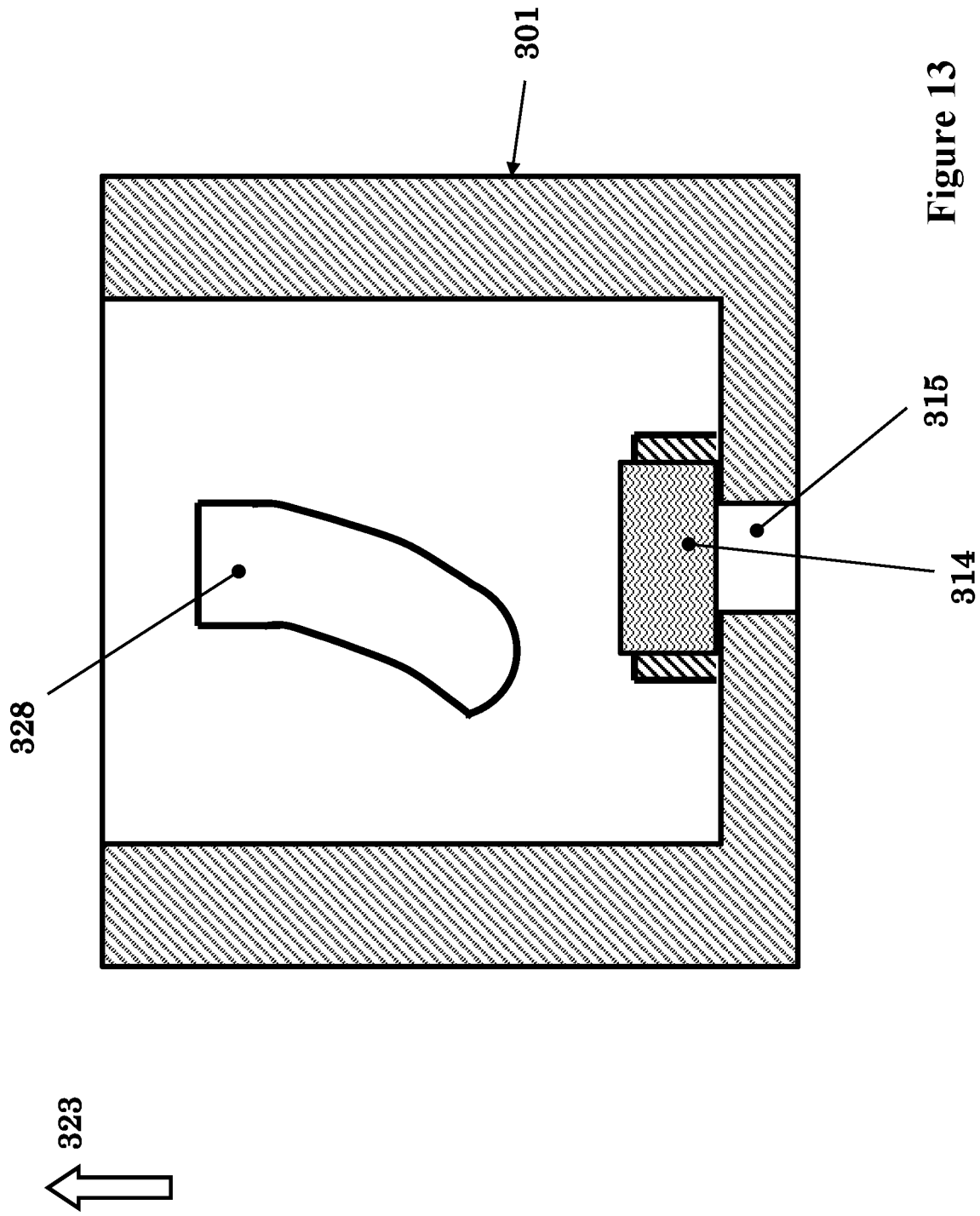
FIG. 13 illustrates the schematic of the cross-sectional view of the modified compact inertial igniter embodiment of FIG. 11 with a curved groove pocket to prevent spinning of the inertial igniter striker mass in it housing and increase initiation time delay.

As can be seen in the view of FIG. 11, the groove pocket 322 is vertical to allow the balls 310 and thereby the striker mass 309 to travel down without rotation relative to the inertial igniter housing 301 when the inertial igniter 325 is subjected to acceleration in the direction of the arrow 323 and as long as the balls 310 are still in the groove pockets 322. To increase the time that it takes for the balls 310 to clear the groove pockets 322 and thereby allow for free downward motion of the striker mass 309 to striker and initiate the percussion primer 314, the groove pockets 322 may have different curves shapes as extended downward from their top surface 326 (306 in FIG. 6), such as a helical shape 328 as shown in FIG. 13.

Figure 14:
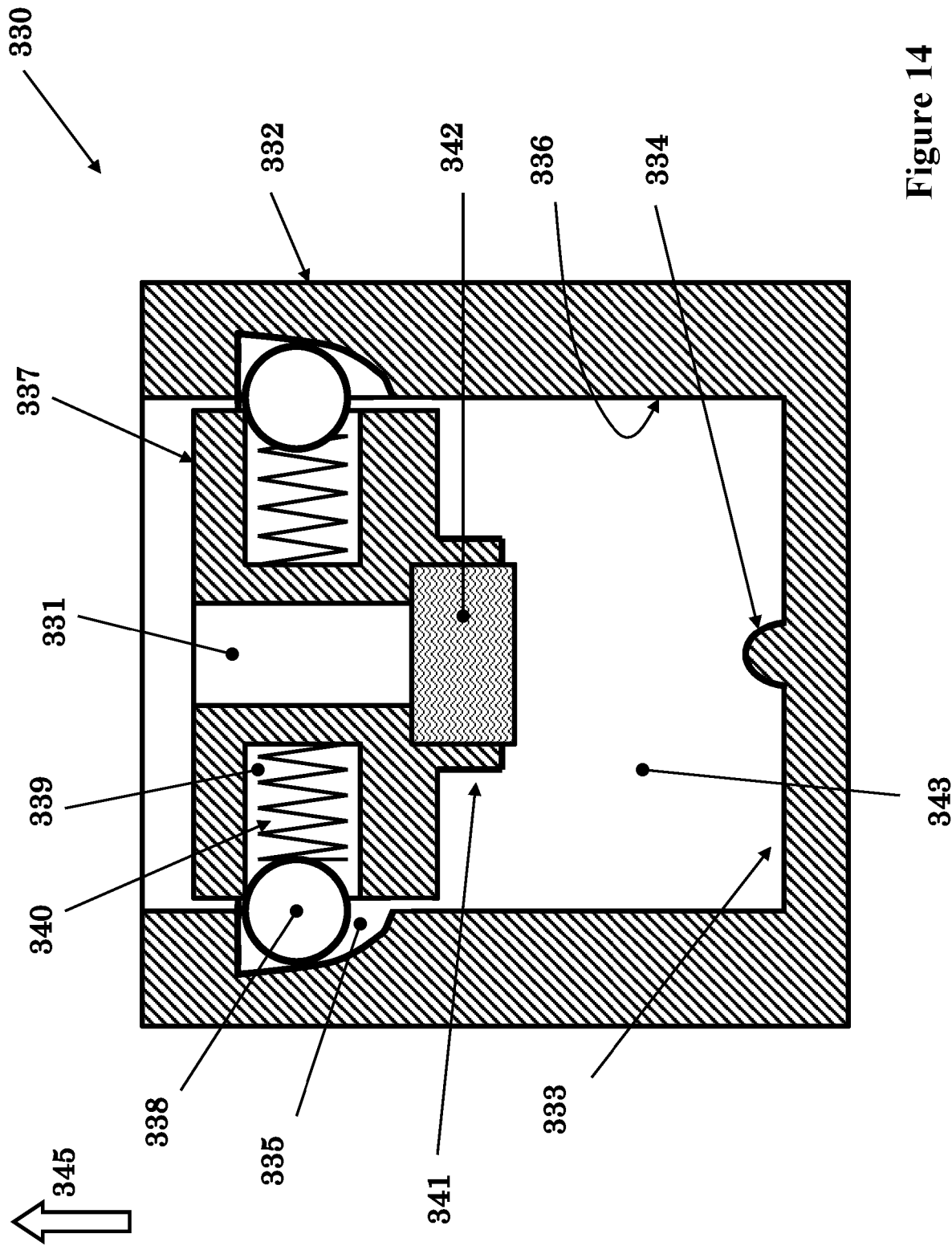
FIG. 14 illustrates the schematic of the cross-sectional view of the compact inertial igniter embodiment configured for ignition flame and spark exiting from the striker mass side of the inertial igniter.
Figure 15:
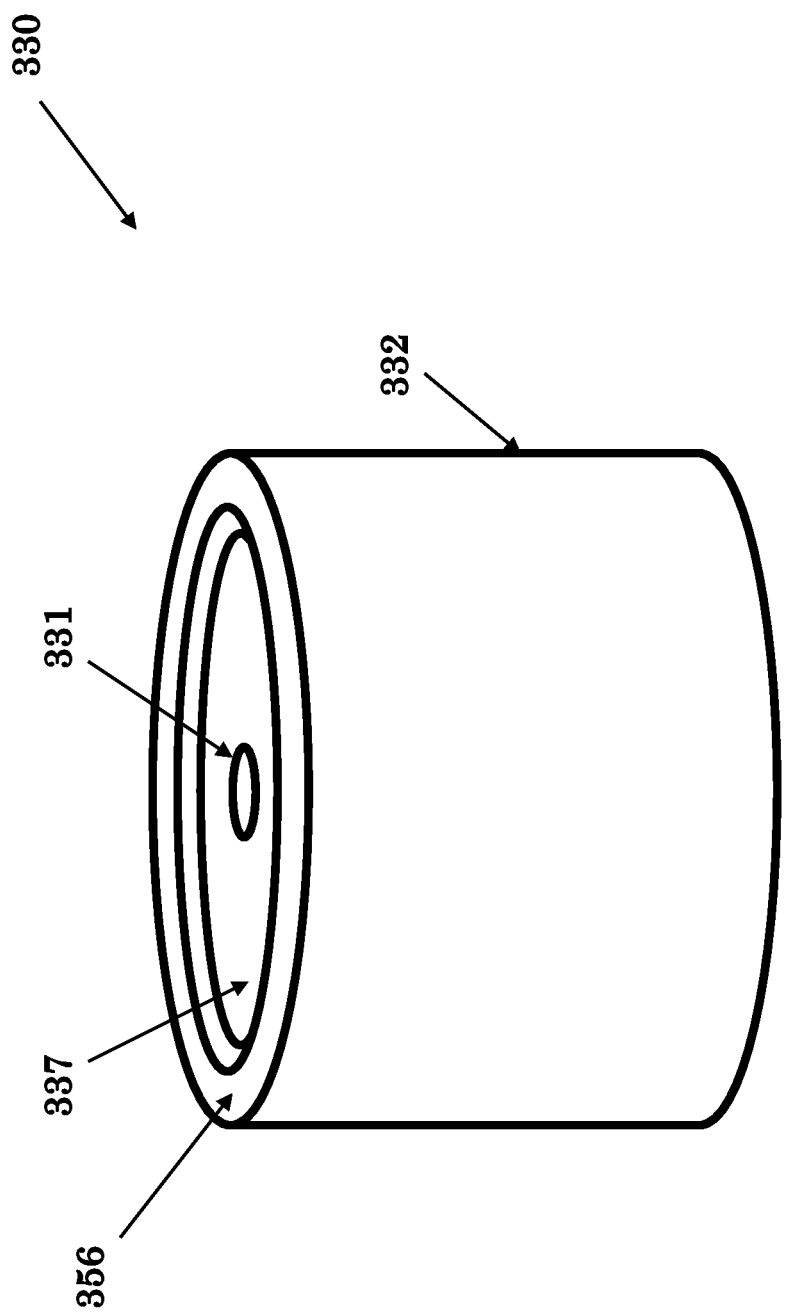
FIG. 15 illustrates the isometric view of the compact inertial igniter embodiment of FIG. 14.

The schematic of the cross-sectional view of another compact inertial igniter 330 is shown in FIG. 14. This embodiment is similar in the configuration to the embodiment 300 of FIG. 6, except that it is configured for the ignition flame and sparks to exit from the striker mass side of the inertial igniter as described below. The isometric view of the compact inertial igniter 330 showing the flame and spark exit hole 331 (usually around 2 mm in diameter) is shown in FIG. 15.

The compact inertial igniter 330 is constructed with a cylindrical igniter body 332 that is identical to the inertial igniter body 301 of inertial igniter embodiment 300 of FIG. 6, except the it is not provided with the pocket 313 and its contained percussion primer and exit hole 315 on its bottom side 317 and instead, on its inside bottom surface 333, it is provided with a relatively sharp tip 334 that is suitable for initiating a percussion primer upon impact with the required amount of kinetic energy.

Around the inside wall 336 (304 in FIG. 6) of the compact inertial igniter body 336 (304 in FIG. 6) is provided an identical continuous groove 335 (305 in FIG. 6), with identical "top" surface 306, a "sidewall" 307 and a "bottom" surface 308 as can also be seen in FIG. 6.

The compact inertial igniter embodiment 330 is provided with a striker mass 337, which is provided with identical pockets 339 (311 in FIG. 6), balls 338 (310 in FIG. 6) and preloaded compressive springs 340 (312 in FIG. 6) as was the striker mass 309 of the inertial igniter embodiment 300 of FIG. 6. The striker mass 337 is, however, provided with a pocket 341, within which a percussion primer 342 is firmly assembled. The striker mass 337 is also provided with an exit hole 331 as shown in FIGS. 14 and 15, through which the flames and sparks generated by the initiation of the percussion primer 342 could exit.

In general, like the compact inertial igniter 300 of FIG. 6, at least three pockets 339 are provided in the striker mass 337, which can be provided symmetrically in a plane perpendicular to the axis of symmetry of the striker mass 337.

Like the striker mass 309 of the compact inertial igniter 300 of FIG. 6, the striker mass 337 can also be cylindrical and is provided with a relatively small clearance with the wall 336, so that it could slide up and down freely inside the cylindrical space 343 within the igniter body 332, unless it is prevented from free up or down translation by the at least one "locking" balls 338.

It is appreciated that in the schematic of FIG. 14, the compact inertial igniter 330 is shown in its pre-activation state. In this state of the compact inertial igniter 330, the preloaded compressive springs 340 can be seen to have forced the balls 338 against the sidewalls of the groove 335, thereby displacing the striker mass upward to the point at which the balls 338 rest against the top surface of the groove 335 as was also described for the compact inertial igniter 300 of FIG. 6.

An operation of the compact inertial igniter embodiment 330 of FIGS. 14 and 15 is similar to that of the compact inertial igniter embodiment 300 of FIG. 6, except for the percussion primer location and the direction of the ignition flame and spark exit. In case of any relatively low magnitude acceleration in the axial direction, i.e., in the direction of the arrow 345, which would overcome the resisting force of the preloaded compressive springs 340, it would initiate a relatively small downward motion of the striker mass 337. Here, relatively low magnitude acceleration is intended to mean acceleration levels that the preloaded compressive springs 340 would support and only allow for downward motion of the striker mass 337 until the balls 338 reach the bottom surface of the groove 335 and that can be calculated as was described previously for the compact inertial igniter embodiment 300 of FIG. 6.

Now when the compact inertial igniter 330 begins to be subjected to an increasing acceleration in the direction of the arrow 345, FIG. 14, the acceleration act on the effective assembled mass of the striker mass 337, which includes the mass contribution of the springs 340 and the balls 338, thereby exerting a dynamic force $F_D$, equation (3). Then, as was described for the compact inertial igniter embodiment 300, as the level of the acceleration in the direction of the arrow 345 is increased beyond the level $a_{min}$, equation (4), the striker mass 337 assembly begins to displace down with increasing velocity, during which time the balls 338 would be rolling/sliding over the surface of the groove 335 as the spring force $F_S$ and therefore the normal reaction force $F_N$ increase due to further compression of the springs 340 due to the inclination angle $\alpha$, FIG. 6.

Now as it was previously described for the compact inertial igniter embodiment 300 of FIG. 6, if the acceleration in the direction of the arrow 345, FIG. 14, is relatively short duration and even if it is relatively high in magnitude, before the balls 310 reach the bottom surface of the groove 335 (as shown in FIG. 9A), the striker mass 337 comes to a stop and is displaced back to its rest position of FIG. 14 by the upward component of the preloaded compressive spring force. The compact inertial igniter 330 can therefore be configured to accommodate, i.e., not activate, when subjected to relatively low magnitude accelerations, such as those experienced during transportation, and short duration and higher accelerations such as accidental drops from relatively low heights.

However, as it was previously described for the compact inertial igniter embodiment 300 of FIG. 6, if the acceleration in the direction of the arrow 345 has high enough magnitude and long enough duration, the striker mass 337 would be accelerated downward and gain speed until the balls 338 impact the bottom surface of the groove 335. The impact of the balls 338 with the inclines bottom surface of the groove (surface 308 with the angles $\theta$ as indicated in FIGS. 6, 9A and 10) would cause the balls 338 to "bounce" back in the direction normal to the bottom surface 308. As a result, the striker mass 337 assembly would "bounce" back upwards in the direction of the arrow 345, i.e., the applied acceleration.

It is appreciated that due to the first such impact, the striker mass 337 assembly (which includes the balls 338 and the springs 340) would begin to move upwards as viewed in FIG. 14 as was previously described for the embodiment 300 of FIG. 6. It is appreciated by those skilled in the art that the said impact rebounding velocity is dependent on the mass of the striker mass 337 assembly and the coefficient of restitution characteristics of the striker body 332 at the impact surface. It is also appreciated by those skilled in the art that the component of the velocity of the balls 338 in the direction of further compressing the compressive springs 340 and related kinetic energy transferred to the springs as potential energy and friction losses between the balls and the surface of the cylindrical pockets 339 housing the springs 340 must be considered in determining the profile of the speed with which the striker mass 337 is going to displace upwards.

Now if the acceleration in the direction of the arrow 345 ceases shortly after the above described balls 338 impact with the bottom (inclined) surface of the groove 335, if the resulting rebounding velocity of the striker mass 337 assembly is high enough, then the striker mass assembly would travel upward until the balls 338 impact the upper surface of the groove 335, and bounce downward with a certain velocity that is again determined by the total mass of the striker mass 337 assembly and the coefficient of restitution between the two impacting objects as was previously described for the compact inertial igniter embodiment 300 of FIG. 6. Otherwise, the striker mass 337 assembly move up and the spring force $F_S$ would eventually bring it to a stop with the balls 338 resting against the surface of the groove 335, i.e., in the compact inertial igniter rest position shown in FIG. 14.

However, if the above acceleration in the direction of the arrow 345 persists and is high enough, i.e., is higher than the prescribed minimum all-fire acceleration level and duration (when used in munitions), as was previously described for the compact inertial igniter embodiment 300 of FIG. 6, the balls 338 will impact the top surface of the groove 335, rebound downwards and depending on its rebounding speed, may impact the bottom surface of the groove 335 a second time and eventually after one or more up and down rebounding against the top and bottom surfaces of the groove 335 it would essentially "settle" over the surface and is pushed inside the spring pockets 339 while being sliding down the surface 336 due to the dynamic force $F_D$ (FIG. 9B), which tends to push the balls 338 inside the pockets 339, i.e., outside the groove 335 space, and thereby freeing the slider mass 337 assembly from engagement with the groove 335 of the housing 332 and to begin to be accelerated downwards.

The striker mass 337 is then accelerated downward and gain further velocity, thereby kinetic energy. The percussion primer 342, which is firmly embedded in the pocket 341 of the striker mass 337, would then strike the sharp tip 334 at the bottom surface 333 of the compact inertial igniter body 332, FIG. 14, and is initiated if the striker mass 337 assembly has gained the requisite kinetic energy.

In the embodiment 330 of FIG. 14, following initiation of the percussion primer 342 (or the provided pyrotechnics compound), the generated flames and sparks are configured to exit upward through the opening 331 to initiate the thermal (or liquid) reserve battery above or initiate an initiation train and the like. Alternatively, side ports may be provided to allow the flame to exit from the side of the compact inertial igniter to initiate the pyrotechnic materials (or the like) of a thermal reserve battery or the like that is positioned around the body of the inertial igniter. Other alternatives known in the art may also be used.

It is appreciated by those skilled in the art that by varying the mass of the striker 337; the spring rate and preload level of the springs 340; the height and angles α and θ of the groove 335 (see FIG. 6); and the distance between the sharp tip 334 of the inertial igniter body 332 and the percussion primer 342, the compact inertial igniter 330 can be configured to match the prescribed all-fire minimum acceleration magnitude and duration and the no-fire requirements for various applications and safety protection, such as against accidental dropping of the compact inertial igniter and/or the munitions or the like within which it is assembled.

It is appreciated that to provide the requisite impact energy, the striker mass 337 assembly the separation distance between the sharp tip 334 of the inertial igniter body 332 and the percussion primer 342 must work together to provide the specified impact energy to initiate the percussion primer when subjected to the remaining portion of the prescribed initiation acceleration profile after the balls 338 have cleared the groove 335.

It is appreciated by those skilled in the art that the compact inertial igniter embodiment 330 of FIG. 14 is intended to be assembled and held firmly in reserve batteries or any other component of a munition or the like that is subjected to indicated accelerations for initiation. It is, therefore, appreciated that if the munition in which the compact inertial igniter is assembled undergoes spinning during the firing, then since the groove 335 in the inertial igniter housing 332 is provided around the entire inner surface of the inertial igniter housing, then the balls 338 provide minimal resistance to the striker mass 337 from spinning (rotating) relative to the compact inertial ignite housing 332. In many applications, such as when the munition spin acceleration in the barrel is very high, such high spin acceleration of the striker mass 337 relative to the inertial igniter housing 332 is not desirable since it could cause damage to the groove 335 and the striker mass and interfere with the proper operation of the inertial igniter as was previously described. For such cases, the compact inertial igniter embodiment 330 may be modified as was previously described for the compact inertial igniter embodiment 300 of FIG. 6 and shown in the compact inertial igniter embodiment 325 of FIG. 11 to prevent spinning of its striker mass relative to the inertial igniter housing.

It is noted that all components and features of such a modified version of the compact inertial igniter embodiment 330 stays the same as those of the embodiment 330 of FIG. 14, except that the groove 335 is replaced by the grooves 322 shown in the schematic of FIG. 11 (or alternatively grooves 328 of FIG. 13).

It is appreciated that as was described for the modified compact inertial igniter embodiment 325 of FIG. 11, the modified "no-spin" version of the compact inertial igniter embodiment 330 is provided with separate "groove pockets" (322 in FIG. 11) of the same central cross-sectional areas as the groove 335 of embodiment 330 but limited in width to accommodate each a single ball 338 as shown in FIG. 11 for the embodiment 323 and its top view of FIG. 12, in which top views of four groove pockets are shown with dashed lines.

It is noted that in the schematics of FIGS. 11 and 12, the compact inertial igniter embodiment 325 are assumed to have four symmetrically positioned groove pockets 322 to accommodate engaging balls as described for the compact inertial igniter embodiment 330 of FIG. 14. However, it is appreciated by those skilled in the art that depending on the size of the striker mass 337 and the housing 332 and the balls 338, the inertial igniter can be provided with more or even fewer number of such groove pockets as long as there is room to accommodate them. It is, however, appreciated that for the sake of stability of striker mass movement, at least three symmetrically positioned groove pockets with proper engaging balls are generally desired to be provided.

It is appreciated that the aforementioned modified version of the compact inertial igniter embodiment 330 of FIG. 14 with four symmetrically provided groove pockets (322 in FIG. 11) looks exactly like the cross-sectional view of the compact inertial igniter embodiment 330 of FIG. 14. The modified version of the compact inertial igniter embodiment 330 also operates as was described previously for the embodiment 330 when subjected to acceleration in the direction of the arrow 345 (323 in FIG. 11) corresponding to prescribed minimum acceleration magnitude and duration (all-fire condition in munitions) and other accidental accelerations (no-fire conditions in munitions). The only difference between the embodiments 330 and its modified version is that in the inertial embodiment 330, the balls 338 can only travel up and down in the groove pockets (322 in FIG. 11) as they are constrained by the walls 324 of the groove pockets, FIG. 11, from displacing in the lateral directions. Thereby the striker mass 337 assembly is prevented from rotating (spinning) relative to the inertial igniter housing 332 while the balls 338 are inside the groove pockets (322 in FIG. 11) when the inertial igniter is subjected to spinning acceleration, which is not the case for the compact inertial igniter embodiment 330 of FIG. 14.

It is appreciated that like the compact inertial igniter 325 of FIG. 11, in the compact inertial igniter embodiment 330, FIG. 14, once the balls 338 have cleared the grove pockets 322 (FIG. 11) under acceleration in the direction of the arrow 345, the striker mass 337 is free to rotate (spin) relative to the inertial igniter housing 332 as it travels down towards the sharp tip member 334. In certain application, however, it might be desirable to prevent such rotational motion of the striker mass 337. This is ready accomplished by extending one or more of the groove pockets 322 further down (as shown with dashed lines in FIG. 11 and indicated by the numeral 327) to or passed the point at which the engaging ball(s) 338 would be after the percussion primer 342 of the striker mass 337 has impacted the sharp tip 334 in the inertial igniter bottom surface 333.

In addition, as it was described for the compact inertial igniter 325 of FIG. 11, the groove pocket 322 is vertical as viewed in FIG. 11 to allow the balls 310 (337 in FIG. 14) and thereby the striker mass 309 (337 in FIG. 14) to travel down without rotation relative to the inertial igniter housing 301 (332 in FIG. 14) when the inertial igniter 325 (330 in FIG. 14) is subjected to acceleration in the direction of the arrow 323 (345 in FIG. 14) and as long as the balls 310 (337 in FIG. 14) are still in the groove pockets 322. To increase the time that it takes for the balls 338 to clear the groove pocket 335 and thereby allow for free downward motion of the striker mass 337 assembly and the percussion primer 342 to strike the sharp tip 334 and be initiated, the groove pockets 322 (FIG. 11) may have different curves shapes as extended downward as shown in FIG. 13 as was previously described for the comp. act inertial igniter 325 of FIG. 11.

In the compact inertia igniters embodiments 300, 325 and 330 of FIGS. 6, 11 and 14, respectively, the striker mass elements (309 and 337 in FIGS. 6 and 14, respectively) are seen to be provided with ball pockets (311 and 339 in FIGS. 6 and 14, respectively) that are perpendicular to the interior surface of the inertial igniter body (304 and 336 in FIGS. 6 and 14, respectively), i.e., normal to the direction of the striker mass displacement.

It is, however appreciated that the ball pockets may also be directed upward (FIG. 16A) or downward (FIG. 16B) from their aforementioned normal direction to the direction of the striker mass displacement.

Figures 16A, 16B:
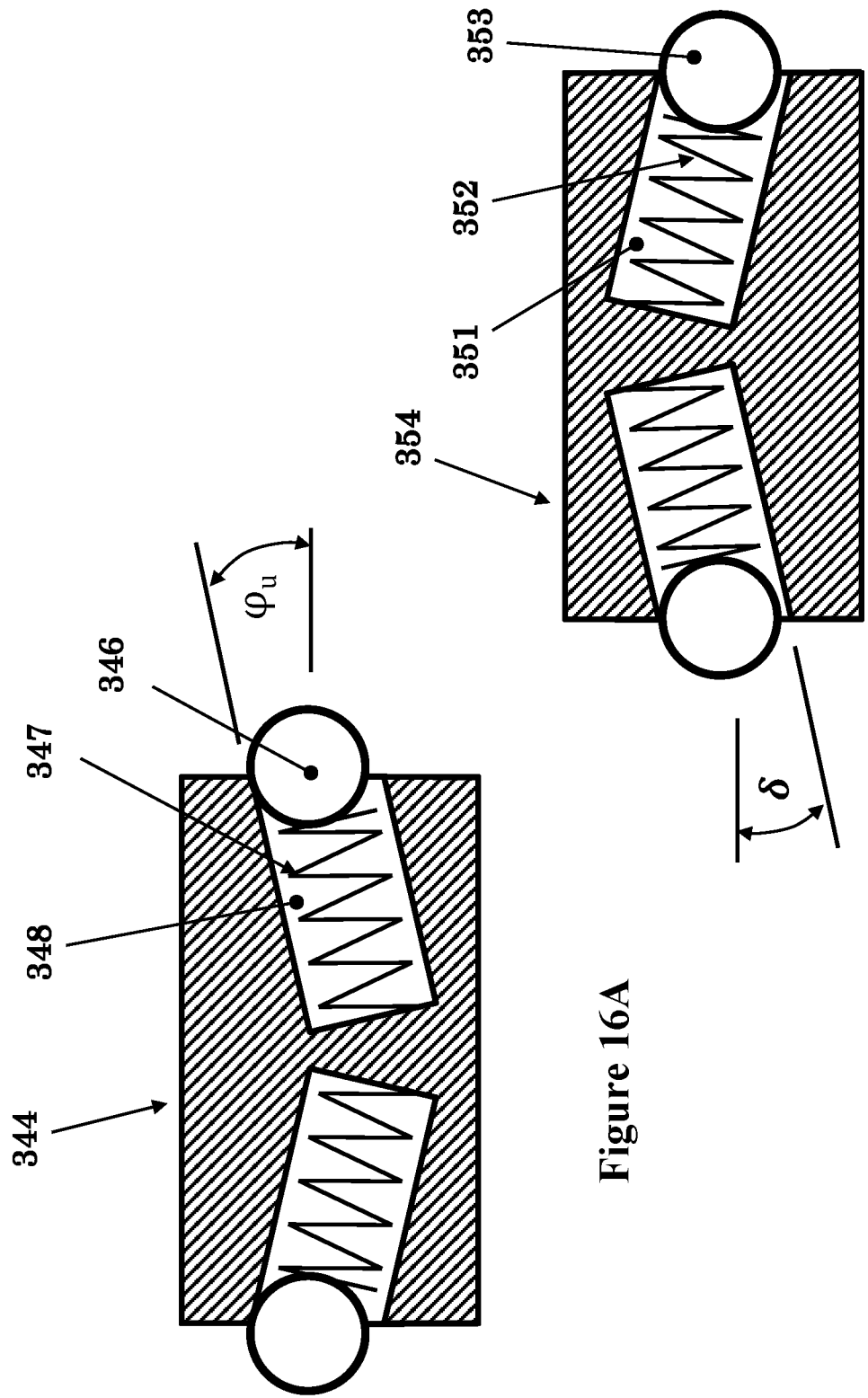
FIG. 16A illustrates the cross-sectional view of a striker mass of the different compact inertial igniter embodiments with ball pockets oriented upward from the direction of perpendicular to the direction of striker mass displacement.
FIG. 16B illustrates the cross-sectional view of a striker mass of the different compact inertial igniter embodiments with ball pockets oriented downward from the direction of perpendicular to the direction of striker mass displacement.

It is appreciated by those skilled in the art that if the ball 346 pocket 348 in the striker mass 344 is directed upward an angle $\varphi_u$ as shown in FIG. 16A, then the lateral force $F_s$ of the preloaded compressive spring 347 as shown in FIG. 8B would be also make an angle $\varphi_u$ with the horizontal centerline as shown with the dashed line arrow 349. As a result, the forces $F_N$ and Fu given by equations (1) and (2) are readily shown to be derived from the force balance equations (8) and (9) below.

$$F_S \sin \varphi_u + F_N \sin \alpha = F_u \quad (8)$$

$$F_N \cos \alpha = F_S \cos \varphi_u \quad (9)$$

Now solving equations (8) and (9) for $F_u$, we obtain $$F_u = F_S \sin\varphi_u + \frac{F_S \cos\varphi_u \sin\alpha}{\cos\alpha}$$

Which can be simplified to $$F_u = F_S(\sin\varphi_u + \cos\varphi_u \tan\alpha) \quad (10)$$

From equation (10) it can be seen that the effect of upward direction of the ball pocket 348 by an angle $\varphi_u$ as shown in FIG. 16A would be to increase the effective force $F_u$ that resists downward motion of the striker mass when the compact inertial igniter 300, 325 and 330 of FIGS. 6, 11 and 14, respectively, are subjected to acceleration in the direction of the arrows 319, 323 and 345, respectively. Which means that the minimum acceleration $a_{min}$, equation (4), in the direction of the arrows 319, 323 and 345 of FIGS. 6, 11 and 14, respectively, that the striker mass members 309 (embodiments of FIGS. 6 and 11) and 337 (embodiment of FIG. 14) is increased.

Similarly, it is appreciated by those skilled in the art that if the ball 353 pocket 351 in the striker mass 354 is directed downward an angle $\varphi_d$ as shown in FIG. 16B, then the lateral force $F_S$ of the preloaded compressive spring 352 as shown in FIG. 8B would be also make an angle $\varphi_d$ with the horizontal centerline as shown with the dashed line arrow 350. As a result, the forces $F_N$ and Fu given by equations (1) and (2) are readily shown to be derived from the force balance equations (11) and (12) below.

$$F_N \sin \alpha - F_S \sin \varphi_d = F_u \quad (11)$$

$$F_N \cos \alpha = F_S \cos \varphi_d \quad (12)$$

Now solving equations (11) and (12) for $F_u$, we obtain $$F_u = -F_S \sin\varphi_d + \frac{F_S \cos\varphi_d \sin\alpha}{\cos\alpha}$$

Which can be simplified to $$F_u = F_S(\cos \varphi_d \tan \alpha - \sin \varphi_d) \quad (13)$$

From equation (13) it can be seen that the effect of downward direction of the ball pocket 351 by an angle $\varphi_d$ as shown in FIG. 16B would be to decrease the effective force $F_u$ that resists downward motion of the striker mass when the compact inertial igniter 300, 325 and 330 of FIGS. 6, 11 and 14, respectively, are subjected to acceleration in the direction of the arrows 319, 323 and 345, respectively. Which means that the minimum acceleration $a_{min}$, equation (4), in the direction of the arrows 319, 323 and 345 of FIGS. 6, 11 and 14, respectively, that the striker mass members 309 (embodiments of FIGS. 6 and 11) and 337 (embodiment of FIG. 14) is decreased.

It is appreciated that as can be seen in the cross-sectional view of FIGS. 6 and 14 of the compact inertial igniter embodiments 300 and 330 and their isometric views of FIGS. 7 and 15, respectively, the top surfaces of their striker mass members 309 and 337 are slightly below the top surfaces 355 and 356 of the inertial igniter housings 301 and 332, respectively. This is configured to be the case so that the compact inertial igniters can be assembled in the reserve battery or other provided housings while being supported on both top and bottom surfaces, and when needed laterally.

Figure 17:
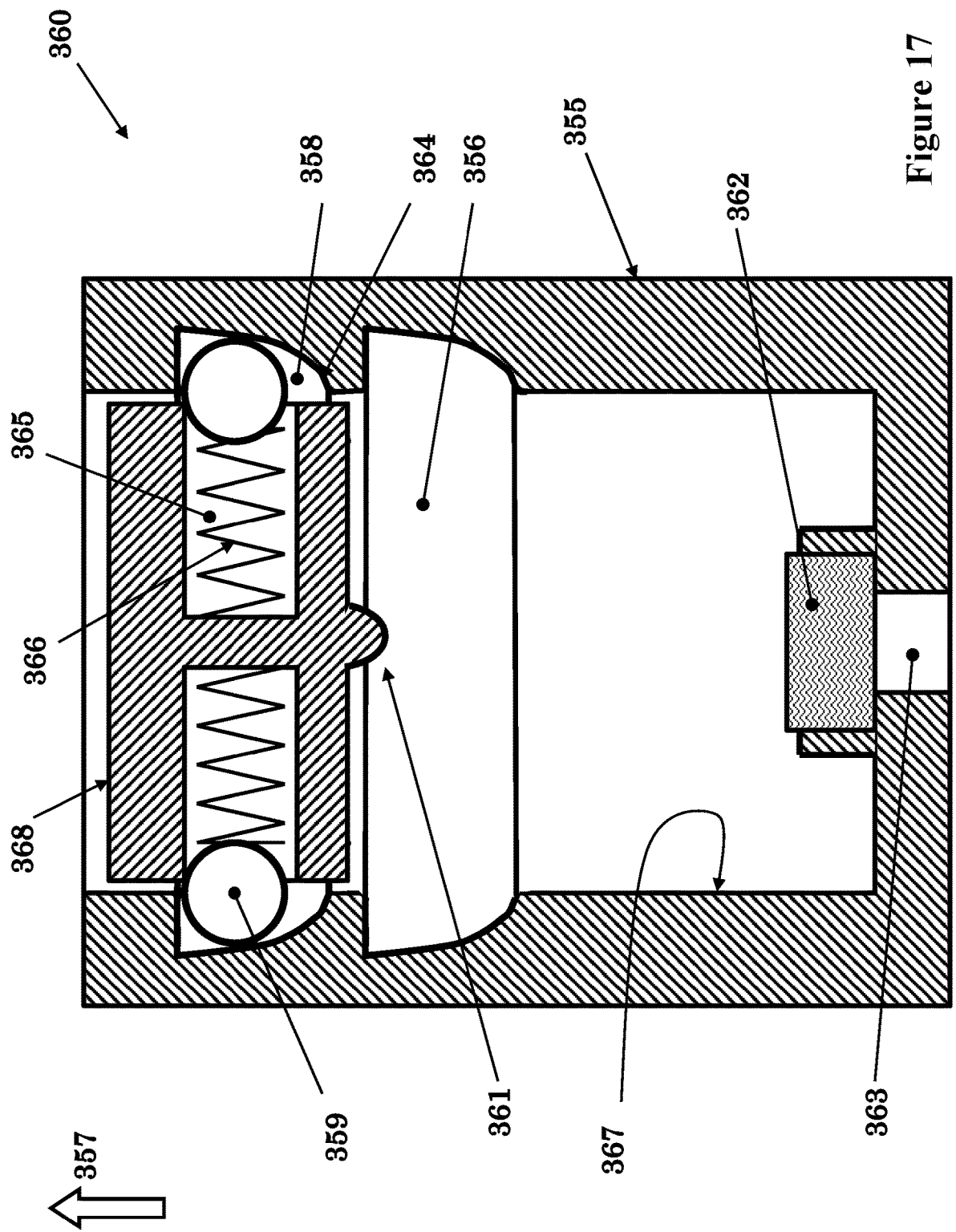
FIG. 17 illustrates the cross-sectional view of a modified compact inertial igniter embodiment of FIG. 6 that is provided with two identical groove pockets.

In the compact inertial igniter embodiments 300 and 330 of FIGS. 6 and 14, respectively, the inertial igniter housing 301 and 332 are shown to be provided with only one grooves pocket 305 and 335, respectively, along the length (vertical direction as viewed in FIGS. 11 and 14) of the compact inertial igniter housings. The compact inertial igniters may, however, be provided with multiple such groove pockets as shown in the schematic of FIG. 17 with two such groove pockets and indicated as the embodiment 360. In FIG. 17, the cross-sectional view of a modified compact inertial igniter embodiment 300 of FIG. 6 is shown that is provided with two identical groove pockets.

In the compact inertial igniter embodiment 360 of FIG. 17, all components of the inertial igniter are identical to those of the embodiment 300 of FIG. 6 except that the height of its housing 355 is increased to accommodate a second identical groove pocket 356.

Then when the compact inertial igniter 360 is subjected to acceleration in the direction of the arrow 357, as was previously described for the embodiment 300 of FIG. 6, if the acceleration in the direction of the arrow 357 persists and is high enough, i.e., is higher than the prescribed minimum all-fire acceleration level and duration (when used in munitions), the balls 359 will impact the bottom surface 364 of the groove pocket 358, rebound and depending on its rebounding speed, may impact the top surface of the groove pocket 358 and eventually after one or more up and down rebounding against the top and bottom surfaces of the groove pocket 358 it would essentially "settle" over the bottom surface 364 and is pushed inside the spring pockets 365 while being sliding down the surface 367 due to the dynamic force $F_D$, FIG. 9B, which tends to push the balls 359 inside the pockets 365, i.e., outside the groove pocket 358 space, and thereby freeing the slider mass 368 assembly from engagement with the groove pocket 358 of the housing 355 and allowing it to begin to move down until the balls 359 engage the second groove pocket 356 and are pushed inside the groove pocket space by the preloaded compressive spring 366.

The same process of the balls 359 impacting the top and bottom surfaces of the groove pocket 356 would then follow and eventually, the balls 359 would similarly "settle" over the bottom surface of the groove pocket 356 and is pushed inside the spring pockets 365 while being sliding down the surface 367 due to the dynamic force $F_D$, FIG. 9B, which tends to push the balls 359 inside the pockets 365, i.e., outside the groove pocket 356 space, and thereby freeing the slider mass 368 assembly from engagement with the groove pocket 356 of the housing 355 and allowing it to begin to be accelerated downwards. The striker mass 309 is then accelerated downward and gain further velocity, thereby kinetic energy. The striker mass 368 sharp tip 361 would then strike the percussion primer 362 and initiates it if the striker mass 368 has gained the requisite kinetic energy.

Then following initiation of the percussion primer 362 (or the provided pyrotechnics compound), the generated flames and sparks are configured to exit downward through the opening 363 to initiate the thermal (or liquid) reserve battery below or initiate an initiation train and the like. Alternatively, side ports may be provided to allow the flame to exit from the side of the compact inertial igniter to initiate the pyrotechnic materials (or the like) of a thermal reserve battery or the like that is positioned around the body of the inertial igniter. Other alternatives known in the art may also be used.

It is appreciated by those skilled in the art that by providing the second grove pocket 356 to the compact inertial igniter 360, the delay time from the start of the prescribed acceleration in the direction of the arrow 357 to the time of initiation of the percussion prier 362 is increased—even almost doubled—as compared to the amount of the time that it would take compact inertial igniter 300 of FIG. 6 for the same prescribed acceleration event. It is appreciated that more than two such groove pockets may be provided in a similar compact inertial igniter to further increase its initiation delay, but at the cost of further increasing the height of the compact inertial igniter. It is also appreciated that once the balls 359 have entered the groove pocket 356, if the acceleration in the direction of the arrow 357 would cease, the balls 359 would still be trapped inside the groove pocket 356 and therefore the striker mass 368 assembly would not return to its initial engagement with the groove pocket 358 as shown in the cross-sectional view of FIG. 17.

It is appreciated that in the above disclosed compact inertial igniters, the ball springs (312, 340, 347, 352 and 366 in FIGS. 6, 14, 16A, 16B and 17, respectively) are biasing the corresponding striker masses (309, 337, 344, 354 and 368 in FIGS. 6, 14, 16A, 16B and 17, respectively) towards their uppermost position, shown for example in FIGS. 6, 14 and 17. However, if needed, added upward biasing force can be provided by the addition of a compressive spring between the striker mass and the compact inertial igniter housing. As an example, the compact inertial igniter embodiment 300 is shown with the added compressive spring 375 in the cross-sectional view of FIG. 18. All other above compact inertial igniter embodiments may similarly be provided with additional compressive springs.

Figure 18:
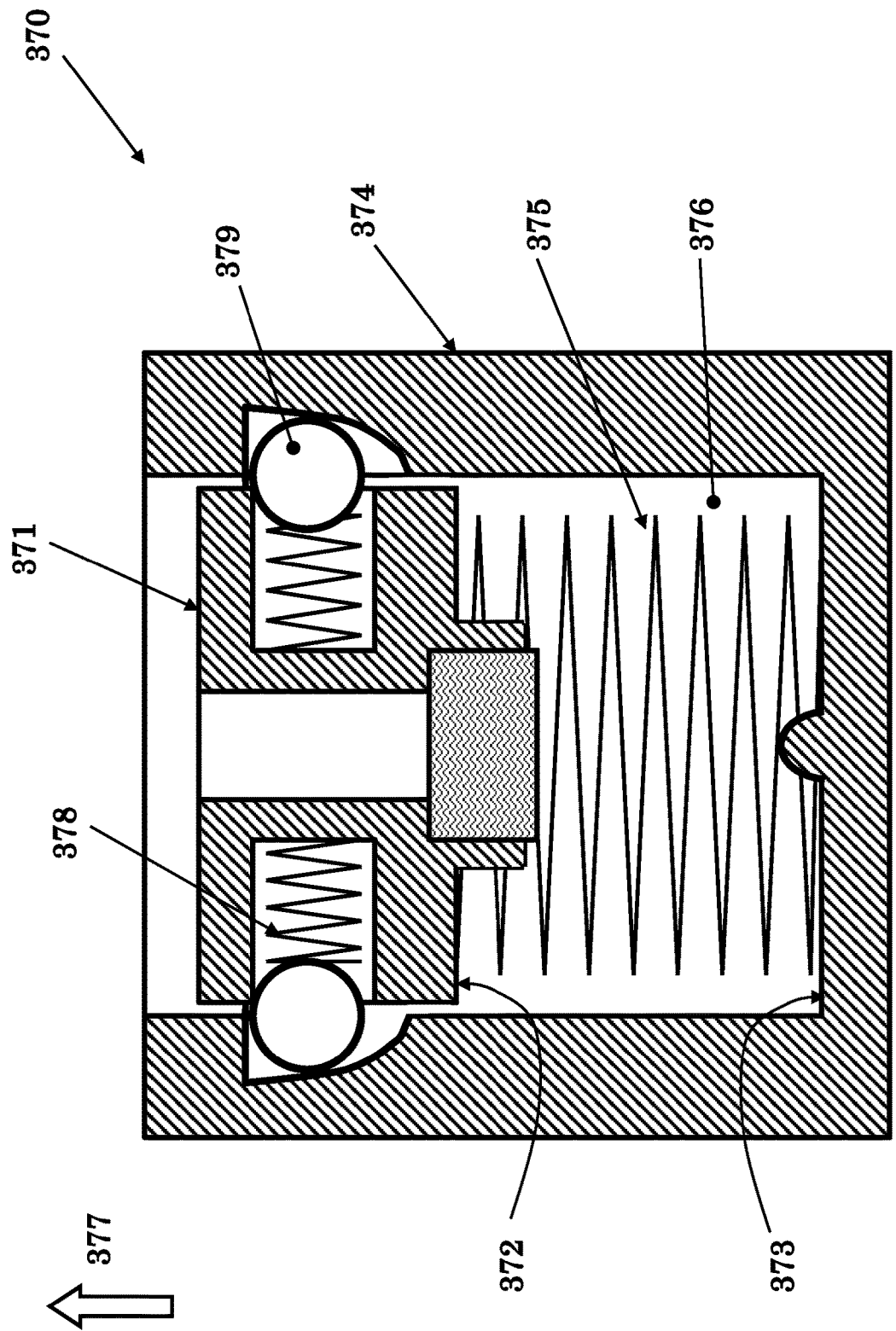
FIG. 18 illustrates the schematic of the cross-sectional view of the compact inertial igniter embodiment of FIG. 14 with added compressive spring to resist striker mass downward motion.

In the compact inertial igniter embodiment 370 of FIG. 18, a compressive spring 375 is shown to be positioned inside 376 the inertial igniter body, between the bottom surface 372 of the striker mass 371 and the bottom surface 373 inside the inertial igniter body 374. As a result, when the inertial igniter begins to be subjected to an increasing acceleration event in the direction of the arrow 377, then as was previously described for the compact inertial igniter embodiment 330 of FIG. 14, the preloaded compressive spring and ball 379 assemblies would resist part of the dynamic force $F_D$, equation (3), until the acceleration level reaches the level of $a_{min}$, equation (4). Then if the compressive spring 375 has a spring constant k and is preloaded a distance d (providing a preloading force $F_p = kd$), then the minimum acceleration level $a_{min}$ at which the striker mass 371 assembly would begin to move down would be increased to $$a_{min} = \frac{F_u + F_p}{m} \tag{14}$$

As can therefore be seen in equation (14), by preloading the compressive spring 375 to provide the force $F_p$, the minimum acceleration $a_{min}$ at which the striker mass 371 would begin to displace and accelerated downward is increased. It is appreciated that the compressive spring 375 would provide added resistive force as it is deformed. For example, once the compressive spring 375 is deformed (i.e., displaced downward as viewed in FIG. 18) a distance δ, then the force applied by the compressive spring 375 to the striker mass 371 is increased by the amount δ, bringing to a total applied force of $$F_p = k(d+\delta) \tag{15}$$

And the $a_{min}$, equation (14), is also similarly increased by the increase in the resisting compressive spring force, equation (15), at each compressive spring deformation level δ.

It is appreciated by those skilled in the art that the addition of the preloaded compressive spring 375 to any of the disclosed compact inertial igniters provides the means of providing a desired no activation acceleration level (no-fire condition for munitions) to the compact inertial igniter.

It is also appreciated by those skilled in the art that similar to the compact inertial igniter embodiment 360 of FIG. 17, which is provided with more than one groove pockets 358 and 356, the compact inertial igniter embodiment 325 of FIG. 11 may also be provided with more than one groove pocket 322 along the length of the inertial igniter body 301. Each additional groove pocket must obviously be positioned below the groove pocket above it. In addition, at least one of the groove pockets must extend down the entire length of the inertial igniter inside surface (as shown by the dashed line 327 in FIG. 11), i.e., as far down as needed for the balls 310 would travel down for the tip 316 of the striker mass 309, FIG. 6, to strike and initiate the percussion primer 314.

The compact inertial igniter embodiments 300, 325, 330, 360 and 370 of FIGS. 6, 11, 14, 17 and 18, respectively, are configured to initiate a percussion primer when subjected to a previously described prescribed all-fire condition or other similar events. An operating mechanism of these embodiments may also be used to construct normally open (closed) electrical switches that close (open) a circuit when subjected to similar prescribed minimum acceleration shock loading levels and durations as described below for inertial igniter embodiment 300 and 330 of FIGS. 6 and 14, but it is readily seen that all other embodiments can be similarly converted to the indicated electrical impulse switched.

In all the above disclosed compact inertial igniter embodiments, in response to a prescribed minimum acceleration level and duration in the activation direction, for example in the direction of the arrow 319 in FIG. 6 for the inertial igniter embodiment 300, the striker mass (309 in FIG. 9) of the inertial igniter is accelerated downward to impact the provided percussion primer or pyrotechnics materials causing them to ignite. The same mechanism used for the release of the striker mechanism due to a prescribed acceleration event (a prescribed minimum acceleration level with a prescribed minimum duration, i.e., a prescribed impulse threshold) can be used to provide the means of opening or closing or both of at least one electrical circuit, i.e., act as a so-called "Impulse Switch", that is actuated only if it is subjected to the above prescribed minimum acceleration level as well as its minimum duration (all-fire condition in munitions), while staying inactive during all impulse conditions, even if the acceleration level is higher than the prescribed minimum acceleration level but its duration is significantly shorter than the prescribed duration threshold.

Such "impulse switches" also have numerous non-munitions applications. For example, such impulse switches can be used to detect events such as impacts, falls, structural failure, explosions, etc., and open or close electrical circuits to initiate prescribed actions.

Such "impulse switch" embodiments for opening/closing electrical circuits, with and without latching features, are described herein together with alternative methods of their configuration, such as modular configurations that can be readily assembled into the customer device or circuit.

The disclosed "impulse switches" function like the disclosed compact inertia igniter embodiments. The "impulse switches" would similarly respond to applied acceleration in the direction of their activation, and when the applied acceleration has a prescribed minimum level and duration, then their "striker mass" (for example, 309 in the embodiment 300 of FIG. 6) is released and is accelerated downwards as was described for the disclosed compact inertial igniters. The difference between the disclosed compact inertial igniters and the "impulse switches" to be disclosed below is that instead of the striker mass initiating a percussion primer, it would be used to open or close an electrical switching mechanism as described below.

The impulse switching mechanism may be held in its activated state, i.e., may be provided with a so-called latching mechanism, or may move back to its pre-activation state after opening or closing the circuit.

A configuration of such impulse switches using the configuration and functionalities of the above disclosed compact inertial igniter embodiments is herein described using the compact inertial igniter embodiment 300 of FIG. 6. However, it is appreciated by those skilled in the art that other disclosed compact inertial igniter embodiments may also be similarly modified to function as impulse switches as will be described below for the embodiment 300 of FIG. 6.

Figure 19:
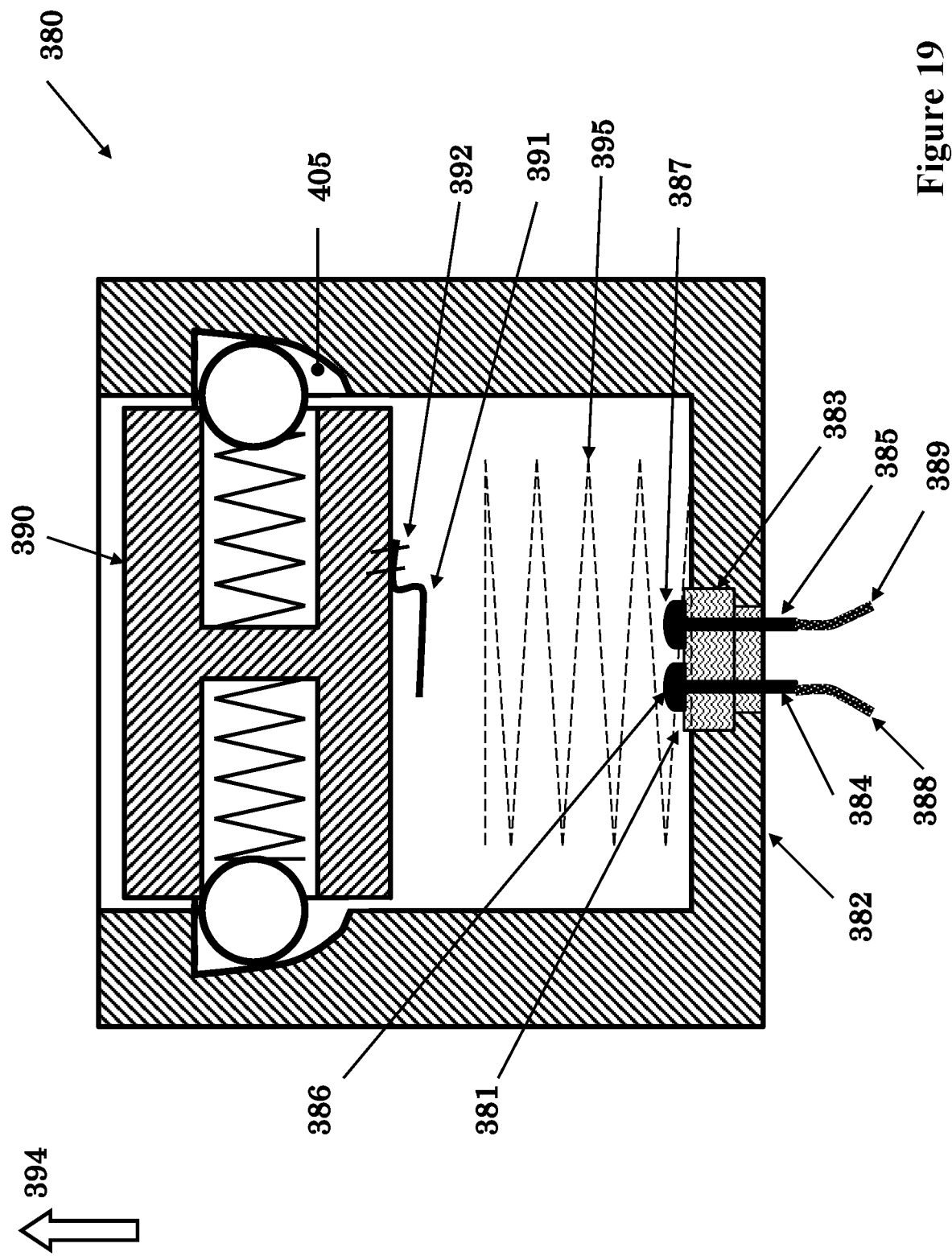
FIG. 19 illustrates a schematic of the cross-sectional view of the normally open non-latching impulse switch embodiment for closing electrical circuits when subjected to a prescribed all-fire or the like acceleration event in its non-activated state.

The schematic of such an impulse switch embodiment 380 is shown in FIG. 19. A configuration of the impulse switch 380 is like the compact inertial igniter embodiment of FIG. 6, except that its percussion primer 314 and the sharp tip 316 of the striker mass are removed and its assembly pocket 313 and the exit hole 315 region are modified to assemble the electrical switching contacts and related elements described below to convert the compact inertial igniter into impulse switches for opening or closing electrical circuits.

In the impulse switch embodiment 380 of FIG. 19, an element 381, which is constructed of an electrically non-conductive material is fixed to the impulse switch base 382 as shown in FIG. 19. The electrically non-conductive element 381 may be attached to the base 382 by fitting it through the provided, such as a stepped hole 383 in the impulse switch base 382 to resist being pressured out of the assembled position shown in FIG. 19. The element 383 is provided with two electrically conductive elements 384 and 385 with contact ends 386 and 387, respectively. The electrically conductive elements 384 and 385 may be provided with the extended ends to form contact "pins" as shown in FIG. 19 for direct insertion into provided holes in a circuit board or may alternatively be provided with wires 388 and 389, respectively, for connection to appropriate circuit junctions, in which case, the wires 388 and 389 may be desired to exit from the sides of the impulse switch 380 (not shown).

Previously described inertial mass 390 (striker mass in the compact inertial igniter 300 of FIG. 6) is provided with a flexible strip of electrically conductive material 391, which is fixed to the surface of the inertial mass 390 as shown in FIG. 19, for example, with fasteners 392 or by soldering or other methods known in the art, such as by being integrally formed with the mass 390.

An operation of the impulse switch 380 of FIG. 19 is very similar to that of the compact inertial igniter 300 of FIG. 6. Here again and as was described for the compact inertial igniter 300, when the impulse switch 380 is accelerated in the direction of the arrow 394, FIG. 19, as the prescribed minimum acceleration level and duration thresholds are reached, the inertial mass 390 is released as was described for the compact inertial igniter 300 of FIG. 6. The inertial mass 390 is then accelerated downward until the strip of electrically conductive material 391 comes into contact with the contact ends 386 and 387, thereby closing the circuit to which the impulse switch 380 is connected (through the extended ends 384 and 385 or wires 388 and 389).

It is appreciated by those skilled in the art that once the strip of electrically conductive material 391 comes into contact with the contact ends 386 and 387, thereby closing the circuit to which the impulse switch 380 is connected, the inertial mass 390 would usually bounce back due to its acquired kinetic energy, thereby ending the indicated closing of the circuit. The impulse switch 380 is thereby suitable for use in circuits in which only a "pulsed" closure of a circuit needs to be detected as a result of the prescribed minimum acceleration level and duration thresholds are detected. The impulse switch embodiment 380 of FIG. 19 is thereby classified as a normally open and non-latching impulse switch. In addition, to ensure that the circuit is not closed and opened multiple times due to the bouncing back and forth of the inertial mass 390, a relatively soft spring 395 (shown in dashed lines in FIG. 19) may be provided to ensure that the inertial mass 390 and its strip of electrically conductive material 391 stay apart from the contacts 386 and 387 following the first closing of the circuit as described above.

Figure 20:
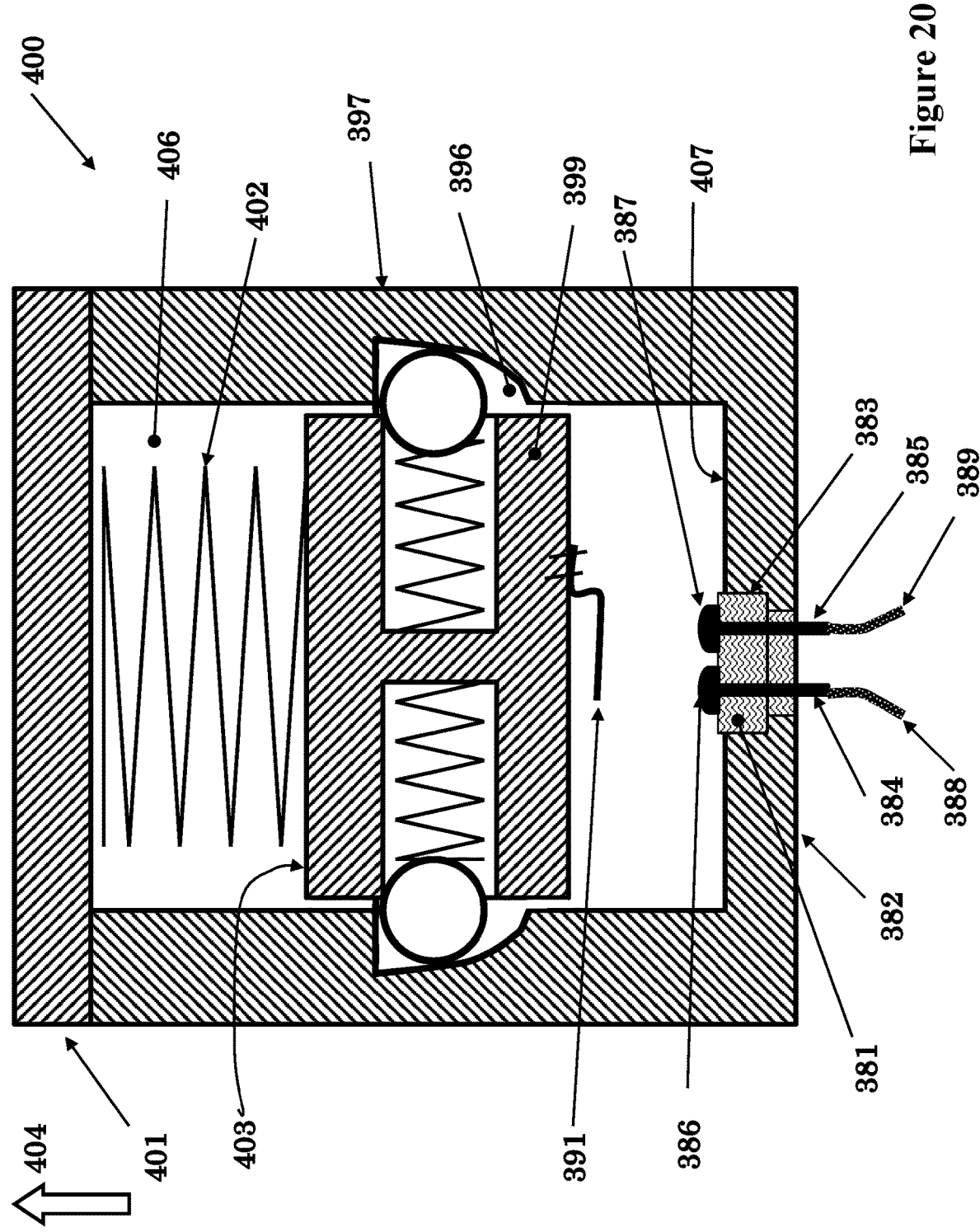
FIG. 20 illustrates the schematic of the cross-sectional view of the modified normally open non-latching impulse switch embodiment of FIG. 19 to convert it to a normally open and latching impulse switch in its non-activated state.

If the impulse switch is desired to stay closed following activation, i.e., if the impulse switch 380 is desired to be a normally open and latching impulse switch, then it can be modified as shown in the cross-sectional view of FIG. 20.

The normally open and latching impulse switch embodiment 400 of FIG. 20 has all its components identical to those of the impulse switch embodiment 380 of FIG. 19, except the following modifications.

In the "normally open and latching impulse switch" embodiment 400 of FIG. 20, the groove pocket 396 (405 in the embodiment 380 of FIG. 19) is positioned closer to the bottom surface 407 of the interior volume of the impulse switch body 397, thereby positioning the inertial mass 399 also closer to the bottom surface 407 as can be seen in FIG. 20. This opens the space 406 above the top surface 403 of the inertial mass 399 inside the impulse switch body 397. The impulse switch body 397 is also provided with a cap member 401, which is fixedly attached to the wall of the impulse switch body 397, for example by fasteners or other means known in the art. Within the space 406 is then provided a preloaded compressive spring 402 between the top cap 401 and the top surface 403 of the inertial mass 399.

The aforementioned configuration parameters of the of the impulse switch embodiment 400 and the characteristics of the compressive spring 402 and its preload level are selected such that when the device to which the "normally open and latching impulse switch" is attached is subjected to acceleration in the direction of the arrow 404 that has the prescribed minimum level and duration, then the inertial mass 399 is released as was previously described for the compact inertial igniter embodiment 300 of FIG. 6. The inertial mass 399 is then accelerated downward until the strip of electrically conductive material 391 comes into contact with the contact ends 386 and 387, thereby closing the circuit to which the impulse switch 400 is connected (through the extended ends 384 and 385 or wires 388 and 389). At this point, the preloaded compressive spring 402 is configured to keep the strip of electrically conductive material 391 in contact with the contact ends 386 and 387 and keep the circuit to which the impulse switch is attached in its closed configuration.

Figure 21:
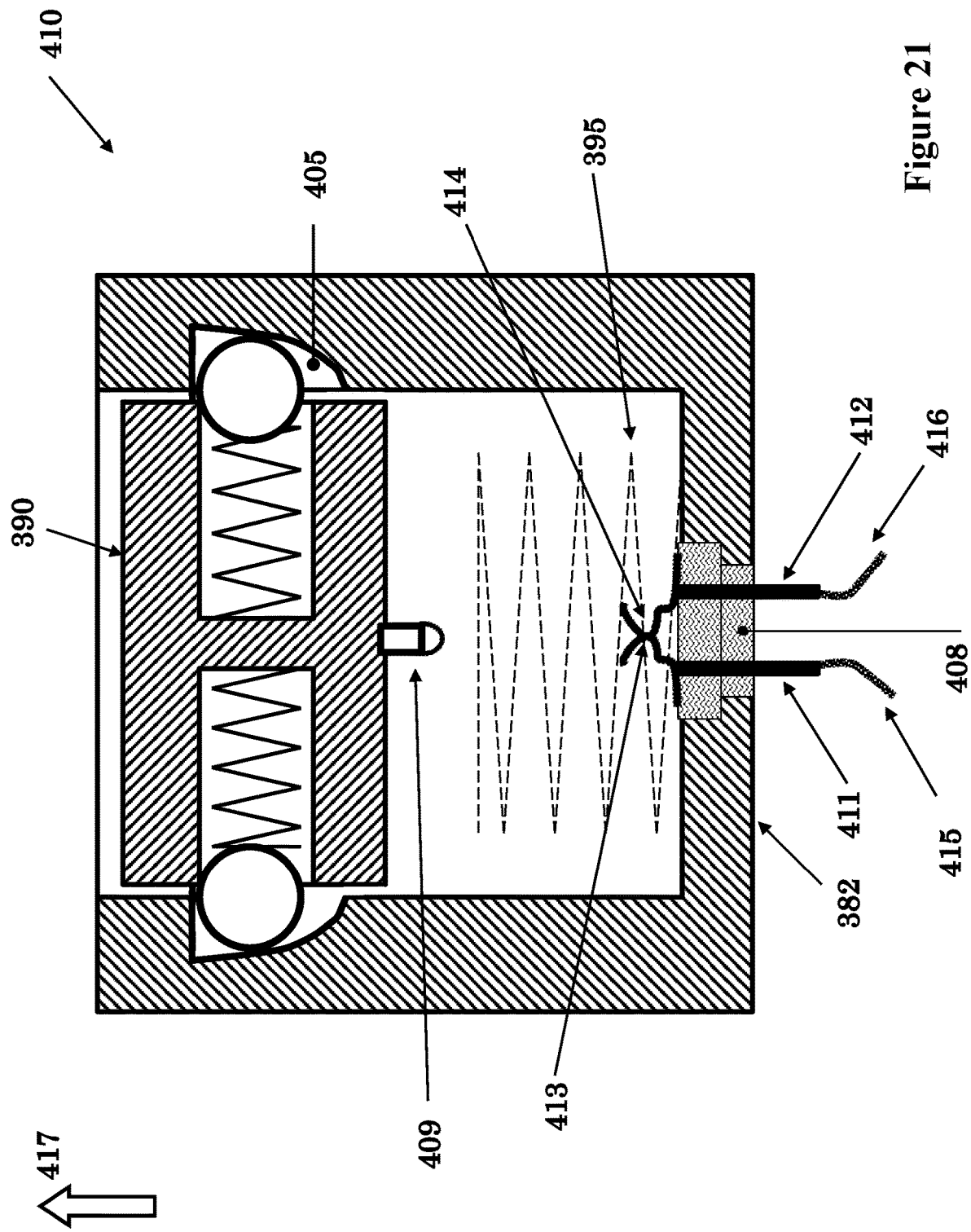
FIG. 21 illustrates the schematic of the cross-sectional view of the normally closed non-latching impulse switch embodiment for opening electrical circuits when subjected to a prescribed all-fire or the like acceleration event in its non-activated state.

The normally open and non-latching impulse switch embodiment 380 of FIG. 19 and the normally open and latching impulse switch embodiment 400 of FIG. 20 may also be modified to function as normally closed and non-latching and normally closed and latching impulse switches. The schematic of such a normally closed and non-latching impulse switch embodiment 410 is shown in FIG. 21. A configuration and operation of the impulse switch 410 is identical to that of the normally open non-latching impulse switch embodiment 380 of FIG. 19, except for its electrical switching contacts and related elements described below to convert it from a normally open to a normally closed impulse switch.

In the normally closed and non-latching impulse switch embodiment 410 of FIG. 21, like the normally open and non-latching impulse switch 380 of FIG. 19, an element 408, which is constructed of an electrically non-conductive material is fixed to the impulse switch base 382. The electrically non-conductive element 408 may be attached to the base 382 by fitting it through the provided stepped hole 452 as shown in FIG. 21. The element 408 is provided with two electrically conductive elements 411 and 412 with flexible contact ends 413 and 414, respectively. The flexible electrically conductive contact ends 413 and 414 are biased to press against each other as seen in the schematic of FIG. 21. As a result, a circuit connected to the electrically conductive elements 411 and 412 is normally closed in the pre-activation state of the impulse switch 410 as shown in the configuration of FIG. 21.

The electrically conductive elements 411 and 412 are shown in FIG. 21 to be provided with the extended ends to form contact "pins" for direct insertion into provided holes in a circuit board or may alternatively be provided with wires 415 and 416 for connection to appropriate circuit junctions, in which case, the wires 415 and 416 may be desired to exit from the sides of the impulse switch 410 (not shown).

The previously described inertial mass 390 is then provided with an electrically nonconductive wedge element 409, which is fixed to the bottom surface of the inertial mass 390 as shown in FIG. 21, for example, by an adhesive or using other methods known in the art.

An operation of the normally closed and non-latching impulse switch 410 of FIG. 21 is very similar to that of the normally open and non-latching impulse switch 380 of FIG. 19. Here again and as was described for the normally open and non-latching impulse switch 380, when the impulse switch 410 is accelerated in the direction of the arrow 417, FIG. 21, as the prescribed minimum acceleration level and duration thresholds are reached, the inertial mass 390 is released as was described for the compact inertial igniter 300 of FIG. 6. The inertial mass 390 is then accelerated downward until the electrically nonconductive wedge element 409 is inserted between the contacting surfaces of the flexible electrically conductive contact ends 413 and 414, thereby opening the circuit to which the impulse switch 410 is connected (through the extended ends 411 and 412 or wires 415 and 416). In addition, to ensure that the circuit is not closed and opened multiple times due to the bouncing back and forth of the inertial mass 390, a relatively soft spring 395 (shown in dashed lines in FIG. 21) may be provided to ensure that the inertial mass 390 and its electrically nonconductive wedge element 409 stay apart from the contacts 413 and 414 following the first opening of the circuit as described above.

Figure 22:
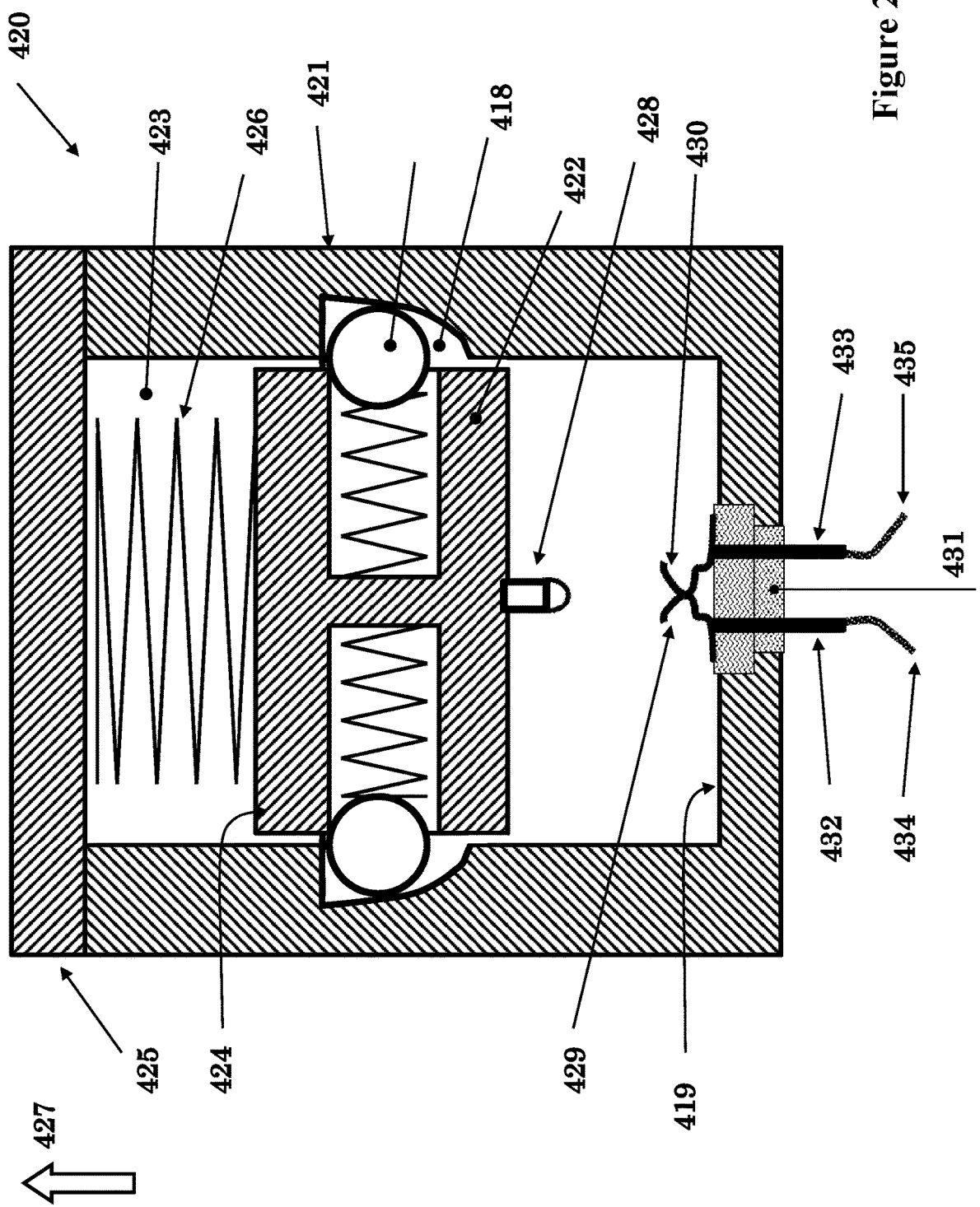
FIG. 22 illustrates the schematic of the cross-sectional view of the modified normally closed and latching impulse switch embodiment of FIG. 21 in its pre-activation configuration.

Like the normally open and non-latching impulse switch embodiment 380 of FIG. 19, the normally closed and non-latching impulse switch embodiment 410 of FIG. 21 may be modified to obtain a normally closed and latching impulse switch as shown in the cross-sectional view of FIG. 22 and indicated as the embodiment 420.

The normally closed and latching impulse switch embodiment 420 of FIG. 22 has all its components identical to those of the impulse switch embodiment 410 of FIG. 21, except the following modifications.

In the "normally closed and latching impulse switch" embodiment 420 of FIG. 22, the groove pocket 418 (405 in the embodiment 405 of FIG. 21) is positioned closer to the bottom surface 419 of the interior volume of the impulse switch body 421, thereby positioning the inertial mass 422 closer to the bottom surface 419 as can be seen in FIG. 22. This opens the space 423 above the top surface 424 of the inertial mass 422 inside the impulse switch body 421. The impulse switch body 421 is also provided with a cap member 425, which is fixedly attached to the wall of the impulse switch body 421, for example by fasteners or other means known in the art. Within the space 423 is then provided a preloaded compressive spring 426 between the top cap 425 and the top surface 424 of the inertial mass 422.

The aforementioned configuration parameters of the of the impulse switch embodiment 420 and the characteristics of the compressive spring 426 and its preload level are selected such that when the device to which the "normally closed and latching impulse switch" embodiment 420 is attached is subjected to acceleration in the direction of the arrow 427 that has the prescribed minimum level and duration, then the inertial mass 422 is released as was previously described for the compact inertial igniter embodiment 300 of FIG. 6. The inertial mass 422 is then accelerated downward until the nonconductive wedge element 428 (409 in FIG. 21) is inserted between the contacting surfaces of the flexible electrically conductive contact ends 429 and 430 (413 and 414 in FIG. 21), thereby opening the circuit to which the impulse switch 420 is connected (through the extended ends 432 and 433 or wires 434 and 435), which are provided in the electrically non-conductive element 431 as was described for the identical element 408 of the embodiment of FIG. 21. In addition, to ensure that the circuit is not subsequently opened, a relatively soft spring 426 may be provided to ensure that the inertial mass 422 and its electrically nonconductive wedge element 428 stay inserted between the contacting surfaces of the flexible electrically conductive contact ends 429 and 430 and keep the circuit to which the impulse switch is attached in its closed configuration.

It is appreciated that the normally open and latching impulse switch embodiment 400 of FIG. 20 has longer height to accommodate the preloaded compressive spring 402. In addition, due to the preloading of the compressive spring 402, to prevent activation at certain level of accidental accelerations in the direction of the arrow 404, either the preloading levels of the compressive springs 312 or the angle α of the grove pocket 305, FIG. 6, must be increased. To avoid these changes and to significantly reduce the height of the normally open and latching impulse switch, the normally open and latching impulse switch embodiment 400 of FIG. 20 can be modified to as shown in the cross-sectional view of FIG. 23, which is hereinafter referred to as the "compact normally open and latching impulse switch" embodiment 440.

Figure 23:
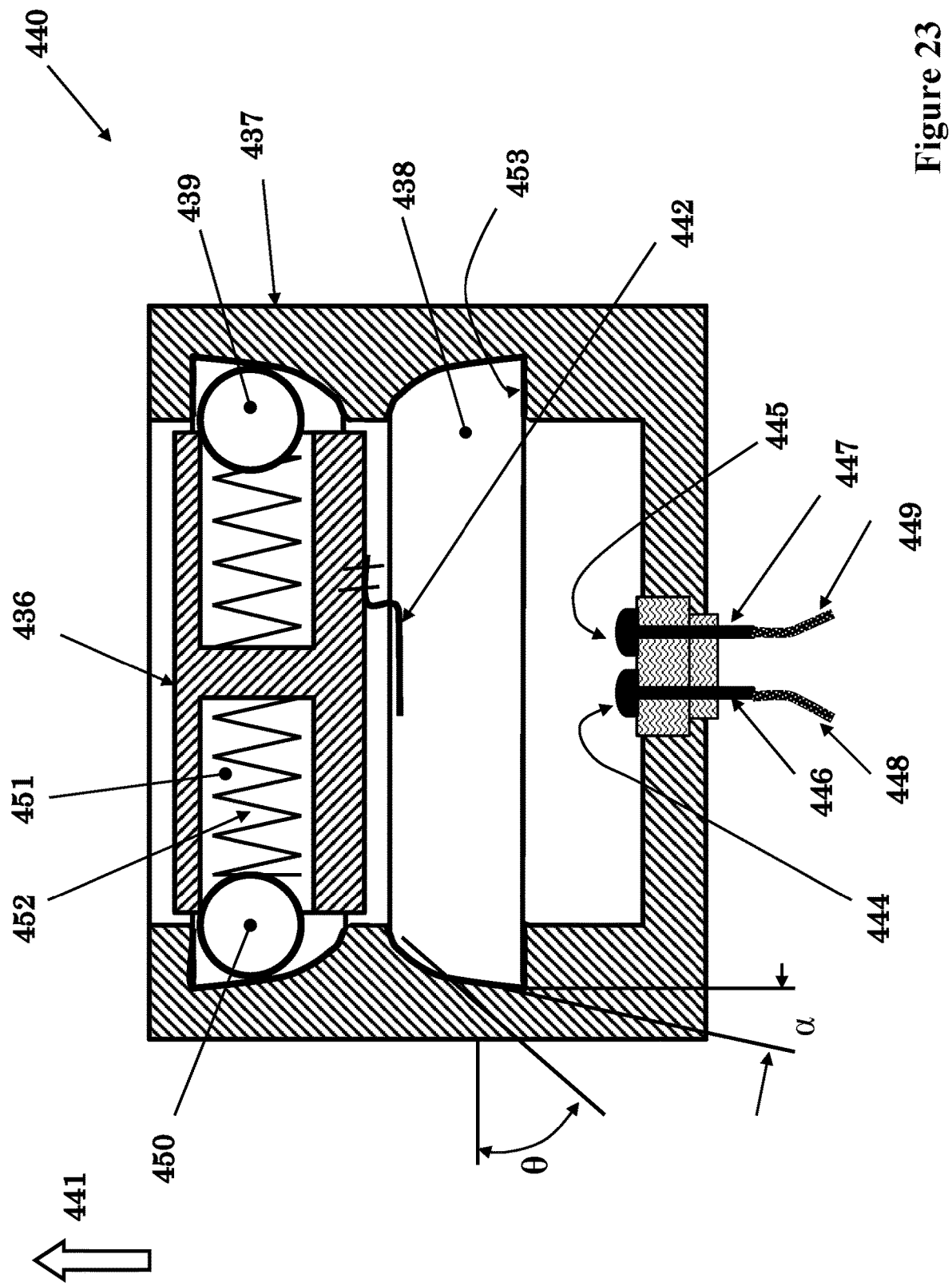
FIG. 23 illustrates the schematic of the cross-sectional view of the modified normally open latching impulse switch embodiment of FIG. 22 in its pre activation configuration.

The "compact normally open and latching impulse switch" embodiment 440 of FIG. 23 uses an inertial mass assembly 436, which is identical to the inertial assembly 399 of the impulse switch embodiment 400 of FIG. 20, i.e., the inertial mass and its assembled balls and preloaded springs, members 309, 310 and 312 as shown in FIG. 6, and the strip of electrically conductive material 391, FIG. 20. The compact normally open and latching impulse switch embodiment 440 also uses a body 437, which is similar to the body 397, with the difference being its smaller height and the addition of a second grove pocket 438 in addition of the groove pocket 439 (396 in FIG. 20).

The added groove pocket 438, however, has an inverted cross-sectional profile (inverted with respect to a line perpendicular to the long axis, i.e., vertical direction as viewed in the plane of FIG. 23) as seen in the cross-sectional view of the compact normally open and latching impulse switch embodiment 440 of FIG. 23. In the cross-sectional profile of the groove pocket 438, the angles α and θ may, however, be different than those of the groove pocket 439 (usually larger angle α and smaller angle θ as described later).

Figure 24:
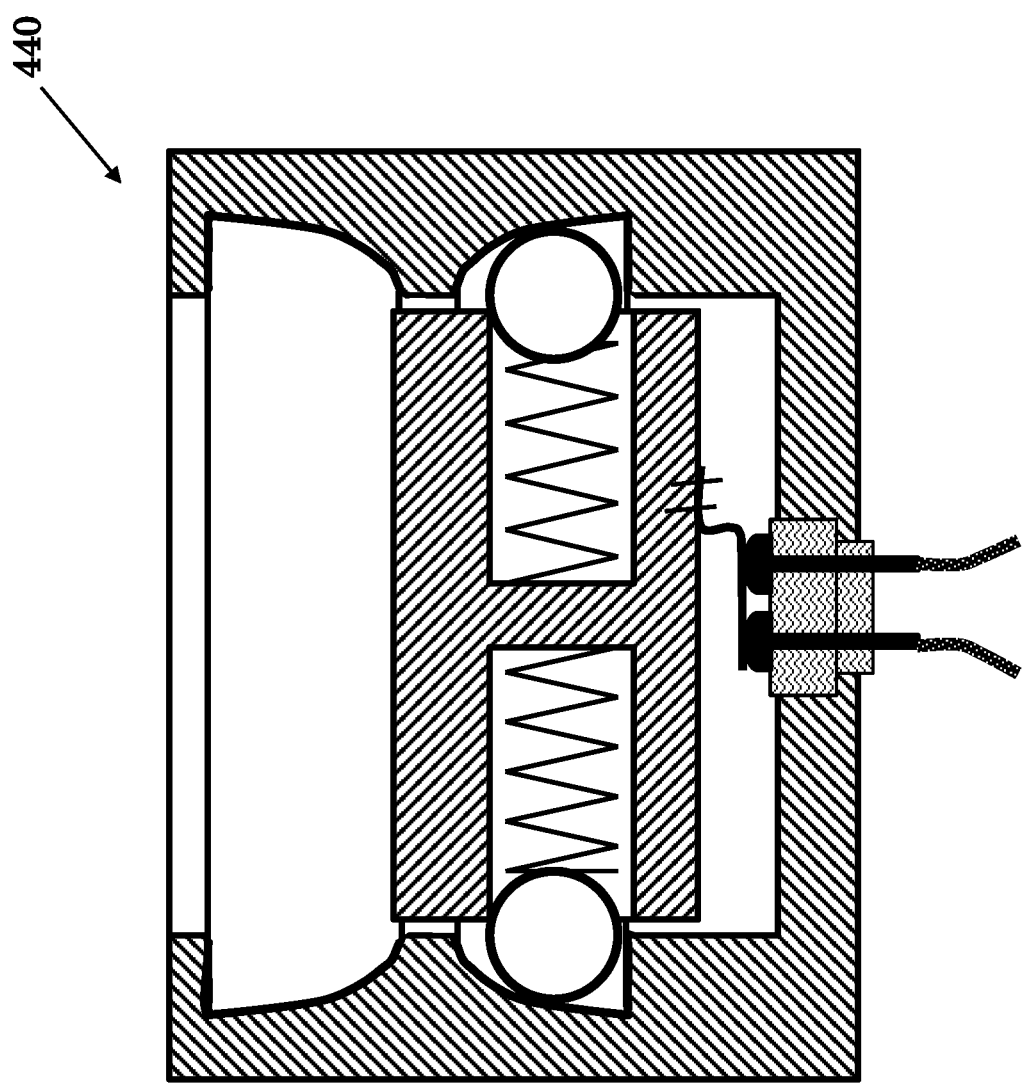
FIG. 24 illustrates the schematic of the cross-sectional view of the normally open latching impulse switch embodiment of FIG. 23 in its post activation configuration

Then similar to the normally open and latching impulse switch embodiment 400 of FIG. 20, when the device to which the "compact normally open and latching impulse switch" embodiment 440 of FIG. 23 is attached is subjected to acceleration in the direction of the arrow 441 that has the prescribed minimum level and duration, then the inertial mass 436 is released as was previously described for the compact inertial igniter embodiment 300 of FIG. 6. The inertial mass 436 is then accelerated downward until the strip of electrically conductive material 442 (391 in FIG. 20) comes into contact with the contact ends 444 and 445 (386 and 387 in FIG. 20), thereby closing the circuit to which the impulse switch 440 is connected (through the extended ends 446 and 447 or wires 448 and 449). At around this time, the balls 450 in the pockets 451 of the inertial mass 436 are pushed into the groove pocket 438 and due to the angle α, they are forced down against the bottom surface 453 of the groove pocket 438. In general, the angle α is made larger than those in the groove pocket 439 so that the downward force acting on the inertial mass 436 due to the forces exerted by the preloaded compressive springs 452 on the balls 450 are increased and thereby the inertial mass is pressed downward, thereby the strip of electrically conductive material 442 is pressed against the contact ends 444 and 445. The angle θ on the other hand is decreased so that the inertial mass 436 would settle in its final position shown in FIG. 24 quickly. The strip of electrically conductive material 442 is also provided with enough flexibility so that as the inertial mass 436 settles in its final positioning shown in FIG. 24, its contact with the contact ends 444 and 445 is not lost. The compact impulse switch embodiment 440 of FIG. 23 would therefore function as a compact normally open and latching impulse switch.

In the impulse switch embodiments of FIGS. 19-23, the electrical contacts and members to open or close the circuits and latch or not to latch them after circuit opening and closing following the detection of the prescribed minimum acceleration level and its duration were accomplished by the specifically configured members and mechanisms for each impulse switch type. However, miniature normally open or closed and latching and non-latching electrical switches are mass produced and relatively low cost and can be used in place of the above switch components. An example, a "Nano-miniature model KMT2" tactile switch, which is 2×2.6 mm in size and 0.65 mm in height and manufactured by C&K Switches of Waltham, Massachusetts may be used in the normally open and non-latching impulse switch embodiment 380 of FIG. 19 in place of the conductive strip 391 and the assembly 383 and its conducting members. Similar miniature switches (normally open or closed and latching and non-latching may also be used in this or other impulse switch embodiments.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A device actuated upon an acceleration greater than a predetermined acceleration profile, the device comprising:
   a body having one or more walls defining an internal cavity, the one or more walls having one or more grooves extending in a longitudinal direction of the internal cavity and extending at least partially along a periphery of the one or more walls;
   a mass movable in the longitudinal direction within the internal cavity, the mass having one or more holes extending in a direction offset from the longitudinal direction;
   a ball partially disposed in the one or more grooves and partially disposed in each of the one or more holes; and
   an elastic material for biasing the ball towards the one or more grooves;
   wherein the groove has a shape such that the acceleration greater than the predetermined acceleration profile causes the ball to first move opposite to the direction of the acceleration and then bounce to move in the direction of the acceleration until the one or more balls moves into the one or more holes to free the mass to move longitudinally in the direction opposite to the acceleration.

2. The device of claim 1, wherein the body having a single cylindrical wall defining the internal cavity.

3. The device of claim 1, wherein the one or more grooves comprises a single groove extending along an entirely of the periphery of the at least one wall.

4. The device of claim 3, wherein the one or more balls comprises three or more balls.

5. The device of claim 1, wherein the one or more grooves comprises a plurality of grooves, each extending along an entirety of the periphery of the at least one wall.

6. The device of claim 5, wherein the one or more balls comprises three or more balls.

7. The device of claim 1, wherein the one or more grooves comprises three or more grooves, each formed partially along the periphery of the at least one wall, and the one or more balls comprises a ball disposed in each of the three or more grooves.

8. The device of claim 1, wherein at least one of the three or move grooves extends further in the direction opposite to the direction of the acceleration than other of the three of more grooves.

9. The device of claim 7, wherein at least one of the three of more grooves is curved in the direction opposite to the direction of the acceleration.

10. The device of claim 1, wherein the at least one hole extends perpendicular to the longitudinal direction.

11. The device of claim 1, wherein the at least one hole extends at an angle offset from being perpendicular to the longitudinal direction.

12. The device of claim 1, wherein the elastic material is a first elastic material and the device further comprises a second elastic material for biasing the mass in the direction of the acceleration.

13. The device of claim 1, wherein the elastic material is a first elastic material and the device further comprises a second elastic material for biasing the mass in the direction opposite to the direction of the acceleration.

14. The device of claim 1, wherein the shape of the groove includes a first portion inclined at a first angle offset from the longitudinal direction and a second portion inclined at a second angle offset from the longitudinal direction, the second angle being greater than the first angle and the second portion being offset from the first portion in the direction opposite to the direction of the acceleration.

15. The device of claim 14, wherein the shape of the groove further comprises a third portion being offset from the first portion in the direction of the acceleration, the first portion acting as a stop to prevent movement of the ball in the groove in the direction of the acceleration.

16. The device of claim 1, wherein the mass and body are configured to produce a spark when the mass experiences the acceleration greater than the predetermined acceleration profile.

17. The device of claim 1, wherein:
one of the mass and the body comprises a projection;
an other of the mass and the body comprises percussion primer for producing the spark when the projection impacts the percussion primer; and
the other of the mass and the body comprising one or more spark holes for directing the spark out of the body.

18. The device of claim 1, wherein the mass and body are configured to one of open or close an electrical circuit when the mass experiences the acceleration greater than the predetermined acceleration profile.

19. The device of claim 18, wherein the device configures one of a latching switch or a non-latching switch.

* * * * *